(12) United States Patent
Kawakami

(10) Patent No.: US 8,539,151 B2
(45) Date of Patent: Sep. 17, 2013

(54) DATA DELIVERY SYSTEM, TERMINAL APPARATUS, INFORMATION PROCESSING APPARATUS, CAPABILITY NOTIFICATION METHOD, DATA WRITING METHOD, CAPABILITY NOTIFICATION PROGRAM, AND DATA WRITING PROGRAM

(75) Inventor: Takashi Kawakami, Tokyo (JP)

(73) Assignee: Sony Corporation, Tokyo (JP)

( * ) Notice: Subject to any disclaimer, the term of this patent is extended or adjusted under 35 U.S.C. 154(b) by 1244 days.

(21) Appl. No.: 11/756,308

(22) Filed: May 31, 2007

(65) Prior Publication Data

US 2008/0005640 A1 Jan. 3, 2008

(30) Foreign Application Priority Data

Jun. 15, 2006 (JP) .................. 2006-166103

(51) Int. Cl.
*G06F 12/00* (2006.01)
(52) U.S. Cl.
USPC ........... 711/115; 711/2; 711/163; 711/170
(58) Field of Classification Search
USPC .............................. 711/2, 163, 170
See application file for complete search history.

(56) References Cited

U.S. PATENT DOCUMENTS

| | | | | |
|---|---|---|---|---|
| 5,634,124 A * | 5/1997 | Khoyi et al. | ............ | 1/1 |
| 7,438,217 B2 * | 10/2008 | Bhella et al. | ......... | 235/375 |
| 7,680,849 B2 * | 3/2010 | Heller et al. | ......... | 707/621 |
| 7,778,968 B2 * | 8/2010 | Cherry | ............ | 707/611 |
| 2003/0003955 A1 * | 1/2003 | Asai et al. | ......... | 455/556 |
| 2003/0018927 A1 * | 1/2003 | Gadir et al. | ......... | 714/4 |
| 2003/0079087 A1 * | 4/2003 | Kuwata | ............ | 711/136 |
| 2004/0088384 A1 * | 5/2004 | Taylor et al. | ......... | 709/219 |
| 2004/0236950 A1 * | 11/2004 | Carte | ............ | 713/176 |
| 2006/0026304 A1 * | 2/2006 | Price | ............ | 710/8 |

FOREIGN PATENT DOCUMENTS

| | | |
|---|---|---|
| JP | 1-233689 | 9/1989 |
| JP | 2005-70924 | 3/2005 |
| WO | WO 03/042915 A1 | 5/2003 |

OTHER PUBLICATIONS

Office Action issued Dec. 20, 2011 in Japanese Patent Application No. 2006-166103, filed Jun. 15, 2006 (with English-language Translation).

* cited by examiner

*Primary Examiner* — Reginald Bragdon
*Assistant Examiner* — Gurtej Bansal
(74) *Attorney, Agent, or Firm* — Oblon, Spivak, McClelland, Maier & Neustadt, L.L.P.

(57) ABSTRACT

Herein disclosed a data delivery system including an information processing apparatus and a terminal apparatus. The terminal apparatus has a first attachment unit, a first writing unit, a first reading unit, a decoding unit, a storage unit, and a first control unit. The information processing apparatus has a second attachment unit, a second writing unit, a second reading unit, and a second control unit.

23 Claims, 25 Drawing Sheets

```
                                <?xml version="1.0"encoding="utf-8"?>
        X1 DEFINITION    { <DEVICE version="1.0"xmlns="http://sony.com/devicecapability/ns#">
        PART
        X2 IDENTIFICATION { <MODELNAME>AP-4**</MODELNAME>
        PART
                            <NICKNAME>MY AUDIO PLAYER</NICKNAME>
        X3 TIMESTAMP PART{ <INSERTEDDATE>2005-01-01T09:39:21Z</INSERTEDDATE>
                            <CAPABILITY>
                            <AUDIOCODEC>
                            <TITLE>ATRACX</TITLE>
                            <BITRATE>128000</BITRATE>
                            <BITRATE>64000</BITRATE>
                            </AUDIOCODEC>
        X4 DATA FORMAT     <AUDIOCODEC>
        PART
                            <TITLE>MP3</TITLE>
                            <BITRATE>128000</BITRATE>
                            <BITRATE>256000</BITRATE>
                            </AUDIOCODEC>
                            <PLAYLISTFORMAT>
                            <TITLE>M3U</TITLE>
                            </PLAYLISTFORMAT>
                            </CAPABILITY>
                            </DEVICE>
```

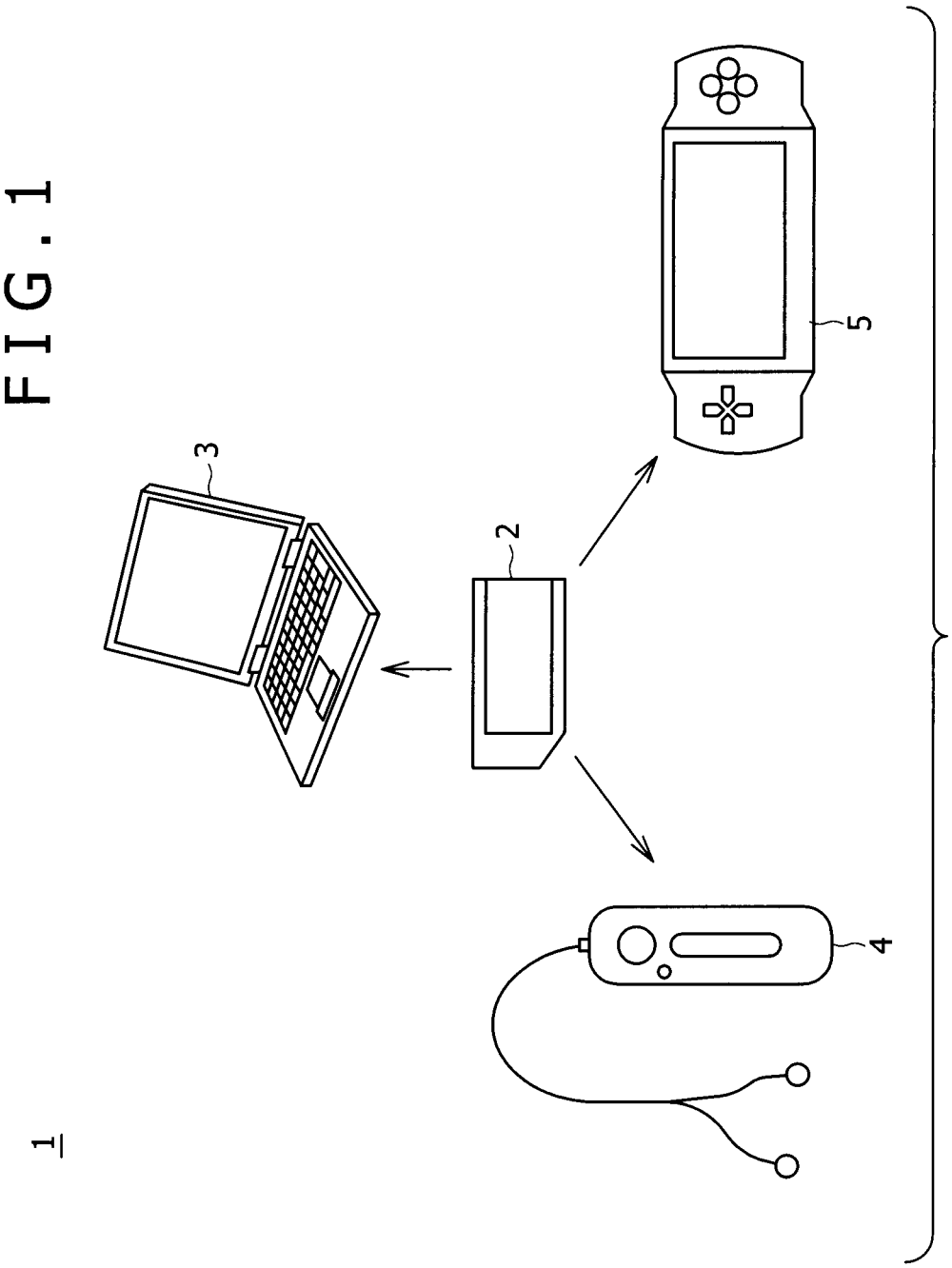

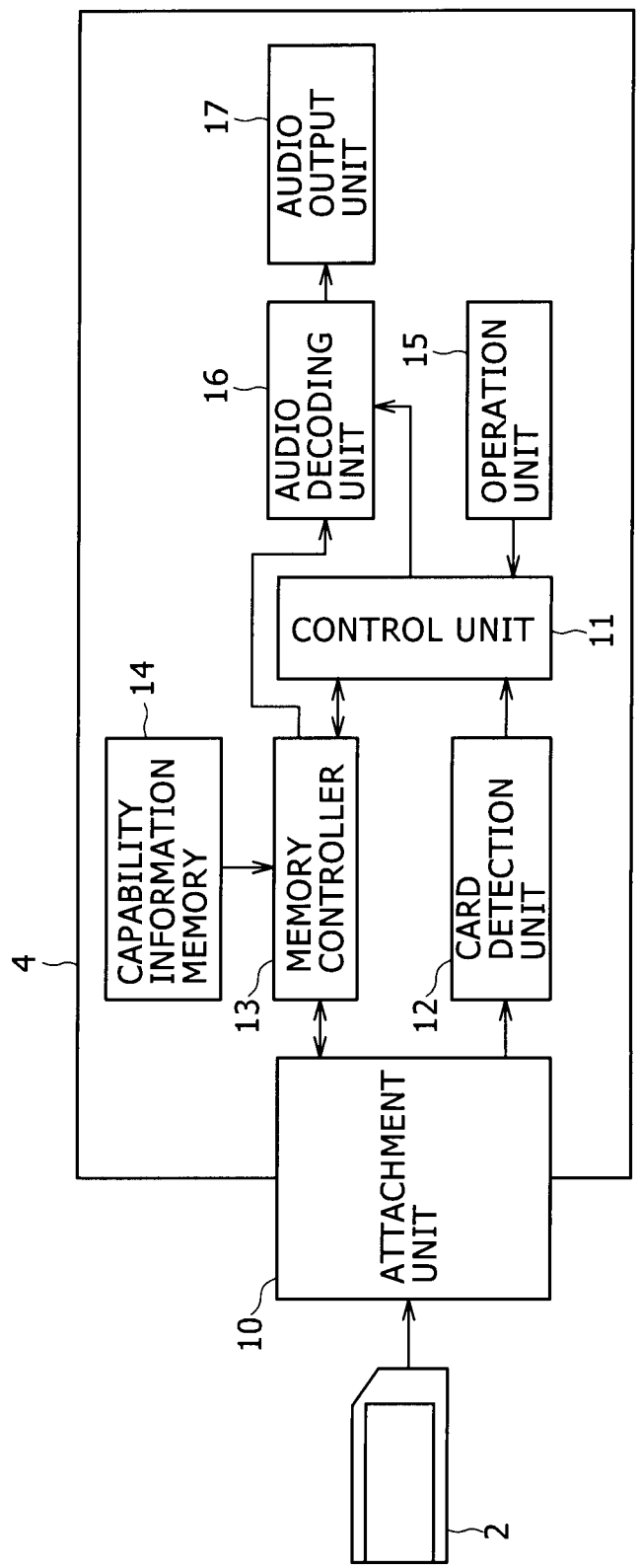

FIG. 3

```
X1 DEFINITION     <?xml version="1.0" encoding="utf-8"?>
PART              <DEVICE version="1.0" xmlns="http://sony.com/devicecapability/ns#">
X2 IDENTIFICATION <MODELNAME>AP-4**</MODELNAME>
PART              <NICKNAME>MY AUDIO PLAYER</NICKNAME>
X3 TIMESTAMP PART <INSERTEDDATE>2005-01-01T09:39:21Z</INSERTEDDATE>
                  <CAPABILITY>
                    <AUDIOCODEC>
                      <TITLE>ATRACX</TITLE>
                      <BITRATE>128000</BITRATE>
                      <BITRATE>64000</BITRATE>
                    </AUDIOCODEC>
                    <AUDIOCODEC>
                      <TITLE>MP3</TITLE>
X4 DATA FORMAT        <BITRATE>128000</BITRATE>
PART                  <BITRATE>256000</BITRATE>
                    </AUDIOCODEC>
                    <PLAYLISTFORMAT>
                      <TITLE>M3U</TITLE>
                    </PLAYLISTFORMAT>
                  </CAPABILITY>
                  </DEVICE>
```

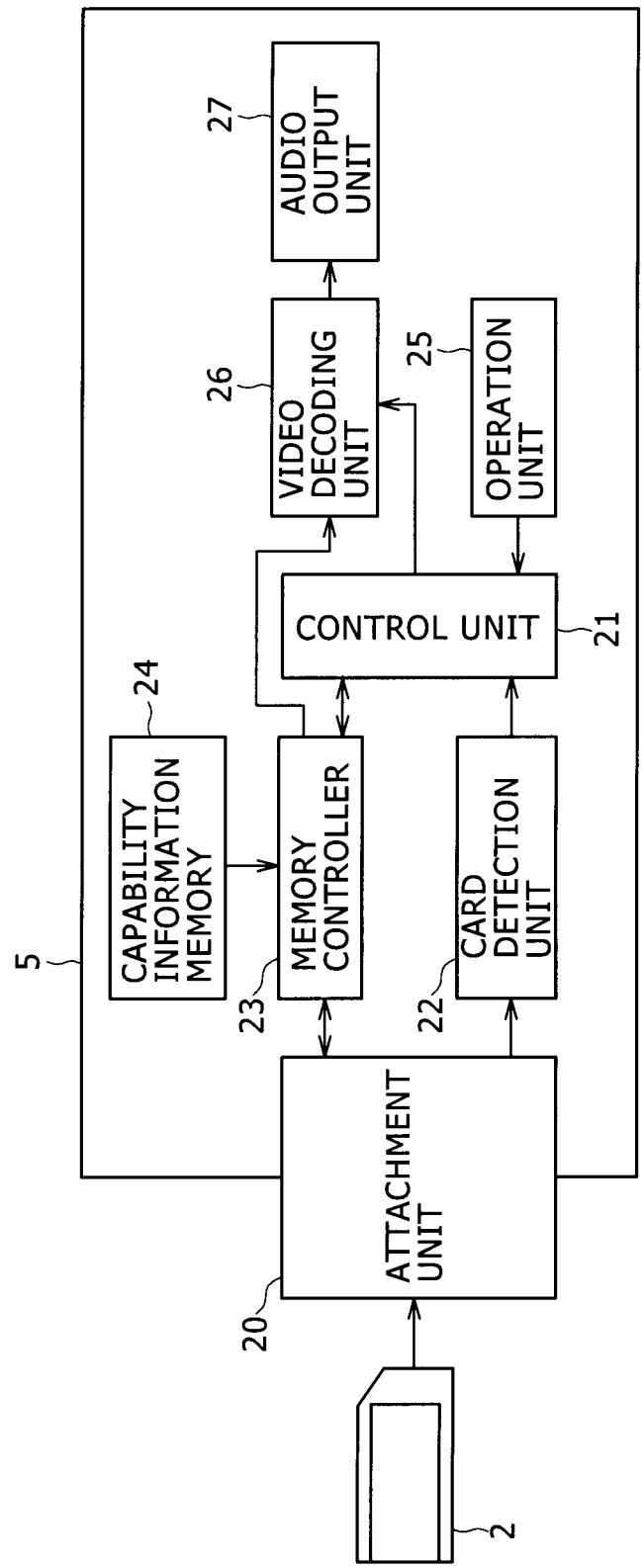

FIG. 5

```
<?xml version="1.0"encoding="utf-8"?>
```
X1 DEFINITION PART

```
<DEVICE version="1.0"xmlns="http://sony.com/devicecapability/ns#">
<MODELNAME>VP-5**</MODELNAME>
```
X2 IDENTIFICATION PART

```
<NICKNAME>MY VIDEO PLAYER</NICKNAME>
```
X3 TIMESTAMP PART

```
<INSERTEDDATE>2005-01-05T10:45:30Z</INSERTEDDATE>
```

X4 DATA FORMAT PART
```
<CAPABILITY>
<VIDEOCODEC>
<TITLE>MPEG4</TITLE>
<BITRATE>768000</BITRATE>
<BITRATE>384000</BITRATE>
</VIDEOCODEC>
<VIDEOCODEC>
<TITLE>H.264</TITLE>
<BITRATE>768000</BITRATE>
<BITRATE>384000</BITRATE>
</VIDEOCODEC>
</CAPABILITY>
</DEVICE>
```

DATA DELIVERY SYSTEM, TERMINAL APPARATUS, INFORMATION PROCESSING APPARATUS, CAPABILITY NOTIFICATION METHOD, DATA WRITING METHOD, CAPABILITY NOTIFICATION PROGRAM, AND DATA WRITING PROGRAM

CROSS REFERENCES TO RELATED APPLICATIONS

The present invention contains subject matter related to Japanese Patent Application JP 2006-166103 filed with the Japan Patent Office on Jun. 15, 2006, the entire contents of which being incorporated herein by reference.

BACKGROUND OF THE INVENTION

1. Field of the Invention

The present invention relates to a data delivery system, a terminal apparatus, an information processing apparatus, a capability notification method, a data writing method, a capability notification program, and a data writing program. More particularly, the invention relates to a data delivery system that delivers data by means of information storage media.

2. Description of the Related Art

There exist data delivery systems each made up of an information processing apparatus (server) and a plurality of terminals connected to a network, the apparatus delivering data to the terminals during operation. In some of these systems, each terminal sends its own decodable data format as capability information (also called profile information) to the information processing apparatus. In turn, the information processing apparatus identifies the decodable data format of a given terminal and delivers data to that terminal in the identified format (e.g., see Japanese Patent Laid-open No. 2005-70924).

Apart from the above systems involving data exchanges between the information processing apparatus and its terminals over the network, there exist other systems utilizing information storage media for data deliveries between the information processing apparatus and its terminals. More specifically, the information processing apparatus (e.g., personal computer) writes data to an information storage medium (e.g., memory card) that is subsequently attached to any one of a plurality of terminals. When the information storage medium is attached to a given terminal, that terminal retrieves the data from the medium whereby data delivery is accomplished.

SUMMARY OF THE INVENTION

In the case of the above-mentioned systems designed to deliver data between the information processing apparatus and its terminals by means of information storage media, the apparatus and the terminals are not connected over a network. That means each terminal cannot send its capability information to the information processing process. The result is that the information processing terminal is incapable of identifying the data format decodable by a given terminal.

With such systems, the user of each terminal needs to notify the information processing apparatus of the data format decodable by his or her own terminal. If the notification made by the user happens to be incorrect, his or her terminal is incapable of decoding the data written on the information storage medium received earlier from the information processing terminal.

The present invention has been made in view of the above circumstances and provides a data delivery system, a terminal apparatus, an information processing apparatus, a capability notification method, a data writing method, a capability notification program, and a data writing program whereby data written on an information storage medium is delivered from one party to another in a manner reliably decodable by the receiving party.

In carrying out the present invention and according to one embodiment thereof, there is provided a data delivery system including an information processing apparatus and a terminal apparatus; wherein, when an information storage medium is attached to the terminal apparatus, the terminal apparatus writes to the information storage medium capability information indicating a data format stored in, and decodable by, the terminal apparatus; and wherein, when the information storage medium with the capability information stored thereon is attached to the information processing apparatus, the information processing apparatus writes data to the information storage medium in the data format indicated by the capability information recorded on the information storage medium.

With the data delivery system according to the invention, the information processing apparatus delivering data to the terminal apparatus by means of the information processing medium automatically identifies the data format decodable by the terminal apparatus when loaded with the medium, and writes data to the information storage medium in the decodable data format automatically identified.

One embodiment of the present invention, as outlined above, is a data delivery system including an information processing apparatus and a terminal apparatus; wherein, when an information storage medium is attached to the terminal apparatus, the terminal apparatus writes to the information storage medium capability information indicating a data format stored in, and decodable by, the terminal apparatus; and wherein, when the information storage medium with the capability information stored thereon is attached to the information processing apparatus, the information processing apparatus writes data to the information storage medium in the data format indicated by the capability information recorded on the information storage medium. The information processing apparatus delivering data to the terminal apparatus by means of the information processing medium automatically identifies the data format decodable by the terminal apparatus when loaded with the medium, and writes data to the information storage medium in the decodable data format automatically identified. The present information is thus implemented illustratively as a data delivery system, a terminal apparatus, an information processing apparatus, a capability notification method, a data writing method, a capability notification program, and a data writing program whereby data is delivered reliably to a data-receiving party using an information storage medium.

BRIEF DESCRIPTION OF THE DRAWINGS

FIG. 1 is a schematic diagram showing an overall configuration of a data delivery system;

FIG. 2 is a block diagram showing functional blocks of an audio player;

FIG. 3 is a schematic view showing details of capability information of the audio player;

FIG. 4 is a block diagram showing functional blocks of a video player;

FIG. 5 is a schematic view showing details of capability information of the video player;

DETAILED DESCRIPTION OF THE PREFERRED EMBODIMENTS

Figure 6:
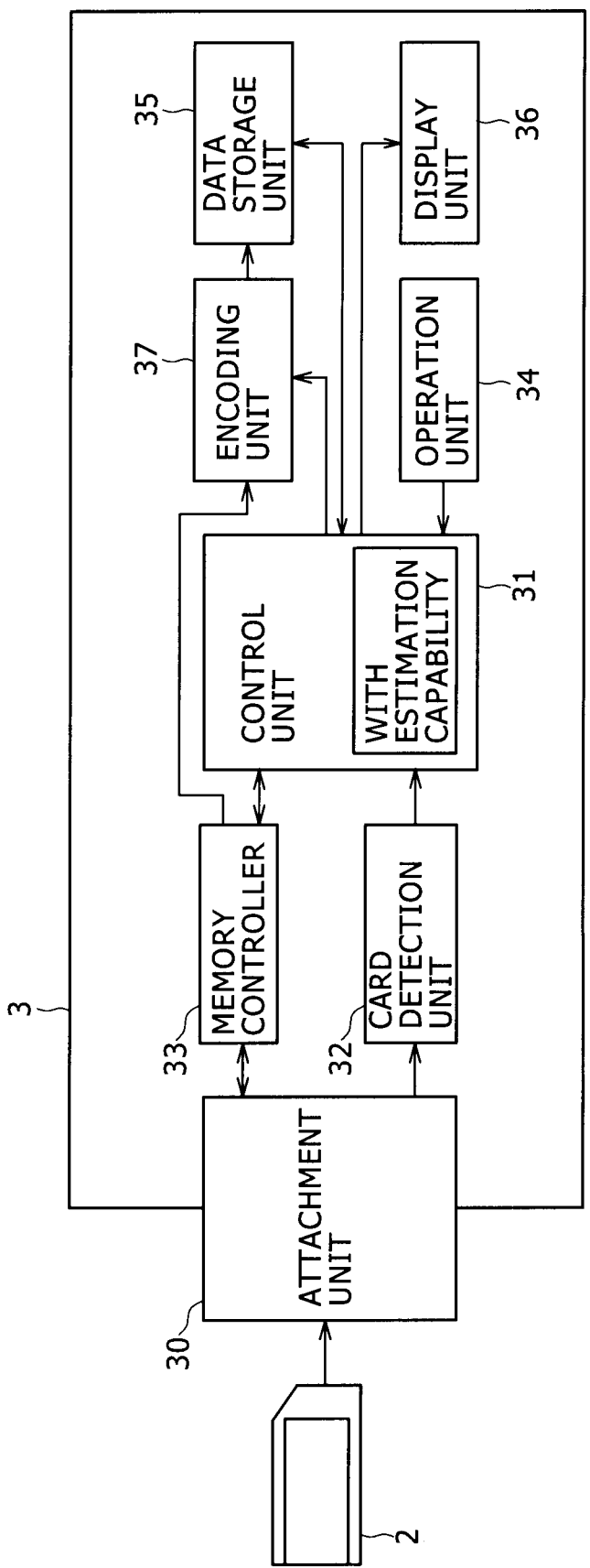
FIG. 6 is a block diagram showing functional blocks of a data storage device.

The preferred embodiments of the present invention will now be described with reference to the accompanying drawings.

(1) First Embodiment (1-1) Overall Configuration of the Data Delivery System In FIG. 1, reference numeral 1 denotes a data delivery system 1 made up of a data storage device 3, a terminal apparatus 4 (called the audio player hereunder), and another terminal apparatus 5 (called the video player hereunder). The data storage device 3 stores diverse data (e.g., audio and video data) and has an attachment unit to which a memory card 2 may be attached. The audio player 4 is capable of reproducing audio data and also has an attachment unit to which the memory card 2 may be attached. The video player 5 is capable of reproducing video data and also has an attachment unit to which the memory card 2 may be attached.

With the data delivery system 1 in use, the data storage device 3 writes audio data to the memory card 2 attached thereto. The memory card 2 is then removed from the data storage device 3 and attached to the audio player 4. The audio data is thus delivered from the data storage device 3 to the audio player 4 via the memory card 2. The data storage device 3 may also write video data to the memory card 2 attached thereto. The memory card 2 is then detached from the data storage device 3 and attached to the video player 5. The video data is thus delivered from the data storage device 3 to the video player 5 using the memory card 2.

It is assumed that the audio and video data stored on the data storage device 3 have been encoded by a predetermined encoding method (i.e., codec). It is also assumed that such audio and video data are supplemented with related information (titles, reproduction times, genres, etc.) and attribute information (codec types, bit rates, etc.).

In the data delivery system 1, the audio player 4 and video player 5 each retain capability information (also called profile information) indicative of the data format (i.e., codec type) decodable by each of the terminals with their reproduction capabilities. When the memory card 2 is attached to the player, the capability information is written to the attached card. When the memory card 2 is attached to the data storage device 3, the device 3 writes diverse data to the attached card in accordance with the data format indicated by the capability information found written on the attached memory card 2.

Thus with the data delivery system 1, the memory card 2 is first attached illustratively to the audio player 4 acting as a data-receiving party. After the capability information of the audio player 4 is written to the memory card 2, the card is removed from there and attached anew to the data storage device 3 serving as a data-delivering party. The capability information found written on the memory card 2 allows the data storage device 3 to identify the data format decodable by the audio player 4 as the data-receiving party and to write audio data to the card in the identified data format.

(1-2) Circuit Structures of the Data Storage Device 3, Audio Player 4, and Video Player 5

Typical circuit structures of the data storage device 3, audio player 4 and video player 5 will now be described. First to be described is the circuit structure of the audio player 4. As shown in FIG. 2, the audio player 4 has an attachment unit 10 to which the memory card 2 may be attached. A control unit 11 provides overall control on the audio player 4 and carries out various processes in keeping with programs retrieved from an internal storage unit, not shown.

More specifically, the control unit 11 of the audio player 4 recognizes whether the memory card 2 is attached to the attachment unit 10 by means of a card detection unit 12. With the memory card 2 detected, the control unit 11 controls a memory controller 13 to read capability information from a capability information memory 14 that retains the capability information of the audio player 4 and to write the retrieved information to the memory card 2. The card detection unit 12 illustratively detects whether the memory card 2 is attached by sensing voltage level variations on a terminal (not shown) connected electrically to the card 2 attached to the attachment unit 10.

The control unit 11 further recognizes whether an operation unit 15 is operated by a user with intent to reproduce the audio data stored on the memory card 2. With the user's audio data-reproducing operation detected, the control unit 11 controls the memory controller 13 to read audio data from the memory card 2 and sends the retrieved data to an audio decoding unit 16.

Under control of the control unit 11, the audio decoding unit 16 acquires an audio signal by performing a decoding process on the audio data sent from the memory controller 13 in accordance with the audio codec type designated for the audio data in question. The acquired audio signal is forwarded to an audio output unit 17 which in turn outputs audio based on the audio signal.

The audio codec type decodable by the audio decoding unit 16 represents the data format decodable by the audio player 4. The capability information of the audio player 4 is primarily formed by the audio codec type decodable by the audio decoding unit 16.

In practice, the capability information of the audio player 4 is typically written to the memory card 2 as a capability information file (e.g., capability.xml) in the form of an XML (eXtensible Markup Language) document file. As shown in FIG. 3, the capability information file is constituted illustratively by a declarative statement of an XML document on line 1 (<?xml version="1.0" encoding="***"?>) and by an ensuing XML document body (enclosed by a starting tag <DEVICE> and an ending tag </DEVICE>).

The document body is further made up of a definition part X1, an identification part X2, a timestamp part X3, and a data format part X4. The definition part X1 defines the tags of the XML document. The identification part X2 describes identification information of the audio player 4. The timestamp part X3 denotes the date and time at which the memory card 2 was attached to the audio player 4. The data format part X4 describes the audio codec type decodable by the audio decoding unit 16.

More specifically, the definition part X1 describes the version of the definition information defining the tags of the body part (version="1.0"), as well as the address at which the definition information is referenced (xmlns="http://*./*/").

The identification part X2 denotes the model name of the audio player 4 (e.g., "AP-4**") between a starting tag <MODELNAME> and an ending tag </MODELNAME> making up a set of "MODELNAME" tags, as well as the nickname of the audio player 4 (e.g., "MY AUDIO PLAYER") between "NICKNAME" tags. The model name and the nickname combine to form the identification information of the audio player 4, i.e., terminal identification information.

The timestamp part X3 denotes, between "INSERTEDDATE" tags, the date and time at which the memory card 2 was attached to the audio player 4 (e.g., "2005-01-01TO09: 39:21Z"). In this timestamp part X3, the portion preceding "TO" (e.g., "2005-01-01") represents a year, a month and a day; and the portion between "TO" and "Z" (e.g., "09:39:21") denotes hours, minutes and seconds. Because the timestamp is approximately the same as the date and time at which the capability information file was written to the memory card 2, the data delivery system 1 treats the timestamp recorded in the timestamp part X3 as a recorded timestamp of that capability information file.

The data format part X4 describes, between "CAPABILITY" tags, "AUDIOCODEC" tags indicating the audio codec type decodable by the audio decoding unit 16. The "AUDIOCODEC" tags are described for each of the decodable audio codec types in use. Between each set of "AUDIOCODEC" tags, there are described one set of "TITLE" tags indicating an audio codec type and at least one set of "BITRATE" tags denoting the bit rate or rates of the audio codec type.

FIG. 3 actually shows two sets of "AUDIOCODEC" tags described in the data format part X4. In one set of "AUDIOCODEC" tags, "ATRAC (Adaptive Transform Acoustic Coding) X" is described between the "TITLE" tags. A bit rate of "128000" is described in one of two sets of "BITRATE" tags, and a bit rate of "64000" in the other set of "BITRATE" tags. In the other set of "AUDIOCODEC" tags, "MP3 (MPEG Audio Layer-3)" is described between the "TITLE" tags. Also in this set of "AUDIOCODEC" tags, a bit rate of "128000" is described in one of two sets of "BITRATE" tags and a bit rate of "256000" in the other set of "BITRATE" tags.

In other words, the data format part X4 of the example above indicates two audio codec types decodable by the audio decoding unit 16, i.e., ATRACX of 128 kbps and 64 kbps, and MP3 of 256 kbps and 128 kbps.

Furthermore, the data format part X4 describes, also between the "CAPABILITY" tags, a set of "PLAYLISTFORMAT" tags indicating the format of the play list (i.e., a list specifying the sequence in which to reproduce audio data) that can be recognized by the audio player 4. Illustratively, a play list format (e.g., "M3U") decodable (i.e., recognizable) by the audio player 4 is written between "TITLE" tags in this set of "PLAYLISTFORMAT" tags.

As described, the capability information file of the audio player 4 indicates the terminal identification information of the audio player 4 and the recorded timestamp of the capability information file in addition to the audio codec types decodable by the audio decoding unit 16.

It should be noted that the audio codec types decodable by the audio decoding unit 16 and the terminal identification information of the audio player 4 are indicated by the capability information written beforehand in the capability information memory 14 of the audio player 4. That is, when the memory card 2 is attached to the audio player 4, the audio player 4 adds a timestamp in effect at that point to the capability information read from the capability information memory 14, and writes the timestamped information to the memory card 2 as the capability information file.

A capability information file may be found previously written on the memory card 2 that may have been attached to the audio player 4 or video player 5 in the past. In such a case, the existing capability information file is overwritten with the new capability information file.

The circuit structure of the video player 5 will now be described. As shown in FIG. 4, the video player 5 has an attachment unit 20 to which the memory card 2 may be attached. A control unit 21 provides overall control on the video player 5 and carries out various processes in keeping with programs retrieved from an internal storage unit, not shown.

More specifically, the control unit 21 of the video player 5 recognizes whether the memory card 2 is attached to the attachment unit 20 by means of a card detection unit 22. With the memory card 2 detected, the control unit 21 controls a memory controller 23 to read capability information from a capability information memory 24 that retains the capability information of the video player 5 and to write the retrieved information to the memory card 2.

The control unit 21 further recognizes whether an operation unit 25 is operated by the user with intent to reproduce the video data stored on the memory card 2. With the user's video data-reproducing operation detected, the control unit 21 controls the memory controller 23 to read video data from the memory card 2 and sends the retrieved data to a video decoding unit 26.

Under control of the control unit 21, the video decoding unit 26 acquires a video signal by performing a decoding process on the video data sent from the memory controller 23 in accordance with the video codec type designated for the video data in question. The acquired video signal is forwarded to a video output unit 27 which in turn outputs video based on the video signal.

The video codec type decodable by the video decoding unit 26 represents the data format decodable by the video player 5. The capability information of the video player 5 is primarily formed by the video codec type decodable by the video decoding unit 26.

In practice, the capability information of the video player 5 is written to the memory card 2 as a capability information file. This capability information is similar in format to the capability information of the audio player 4. Like reference characters designate like or corresponding parts of the capability information in both FIG. 3 and FIG. 5.

A detailed comparison of the capability information of the video player 5 with that of the audio player 4 reveals that the identification part X2, timestamp part X3, and data format part X4 differ in details between the two players.

More specifically, the model name of the video player 5 (e.g., "VP-5**") is described between "MODELNAME" tags and the nickname of the video player 5 (e.g., "MY VIDEO PLAYER") between "NICKNAME" tags in the identification part X2. The nickname is information which can be set as desired by the user. The model name and the nickname combine to form the identification information of the video player 5, i.e., terminal identification information.

The timestamp part X3 denotes, between "INSERTED-DATE" tags, the date and time at which the memory card 2 was attached to the video player 5 (e.g., "2005-01-05TO10:45:30Z").

The data format part X4 describes, between "CAPABILITY" tags, "VIDEOCODEC" tags indicating the video codec type decodable by the video decoding unit 26. The "VIDEOCODEC" tags are described for each of the decodable video codec types. Between each set of "VIDEOCODEC" tags, there are described one set of "TITLE" tags indicating a video codec type and at least one set of "BITRATE" tags denoting the bit rate or rates of the video codec type.

FIG. 5 actually shows two sets of "VIDEOCODEC" tags described in the data format part X4. In one set of "VIDEOCODEC" tags, "MPEG-4 (Moving Picture Experts Group Phase 4)" is described between "TITLE" tags. Also in this set of "VIDEOCODEC" tags, a bit rate of "768000" is described in one of two sets of "BITRATE" tags, and a bit rate of "384000" in the other set of "BITRATE" tags. In the other set of "VIDEOCODEC" tags, "H.264" is described between "TITLE" tags, and a bit rate of "768000" is written in one of two sets of "BITRATE" tags and a bit rate of "384000" in the other set of "BITRATE" tags.

In other words, the data format part X4 of the preceding example indicates two video codec types decodable by the video decoding unit 26, i.e., MPEG-4 of 768 kbps and 384 kbps, and H.264 of 768 kbps and 384 kbps.

As described, the capability information file of the video player 5 indicates the terminal identification information of the video player 5 and the recorded timestamp of the capability information file in addition to the video codec types decodable by the video decoding unit 26.

It should be noted that the video codec types decodable by the video decoding unit 26 and the terminal identification information of the video player 5 are indicated by the capability information written beforehand in the capability information memory 24 of the video player 5. That is, when the memory card 2 is attached to the video player 5, the video player 5 adds a timestamp in effect at that point to the capability information read from the capability information memory 24 and writes the timestamped information to the memory card 2 as the capability information file.

A capability information file may be found previously written on the memory card 2 that may have been attached to the audio player 4 or video player 5 in the past. In such a case, the existing capability information file is overwritten with the new capability information file. In this manner, the memory card 2 is arranged to retain only the latest capability information file (i.e., capability information file of the audio player 4 or video player 5 to which the memory card was most recently attached).

The circuit structure of the data storage device 3 will now be described. As shown in FIG. 6, the data storage device 3 has an attachment unit 30 to which the memory card 2 may be attached. A control unit 31 provides overall control on the data storage device 3 and carries out various processes in keeping with programs retrieved from an internal storage unit, not shown.

More specifically, the control unit 31 of the data storage unit 3 recognizes whether the memory card 2 is attached to the attachment unit 30 by way of a card detection unit 32. With the memory card 2 detected, the control unit 31 controls a memory controller 33 to search the memory card 2 for a capability information file. When the capability information file is detected, the control unit 31 controls the memory controller 33 to read the file from the memory card 31 for analysis.

Suppose that the memory card 2 was most recently attached to the audio player 4. In that case, the capability information file of the audio player 4 such as the one shown in FIG. 3 is found written on the memory card 2. The control unit 31 of the data storage device 3 analyzes the content of the capability information file to determine that the audio codec types decodable by the audio player 4, to which data is to be delivered via the memory card 2, are ATRACX of 128 kbps and 64 kbps and MP3 of 256 kbps and 128 kbps.

Figure 7:
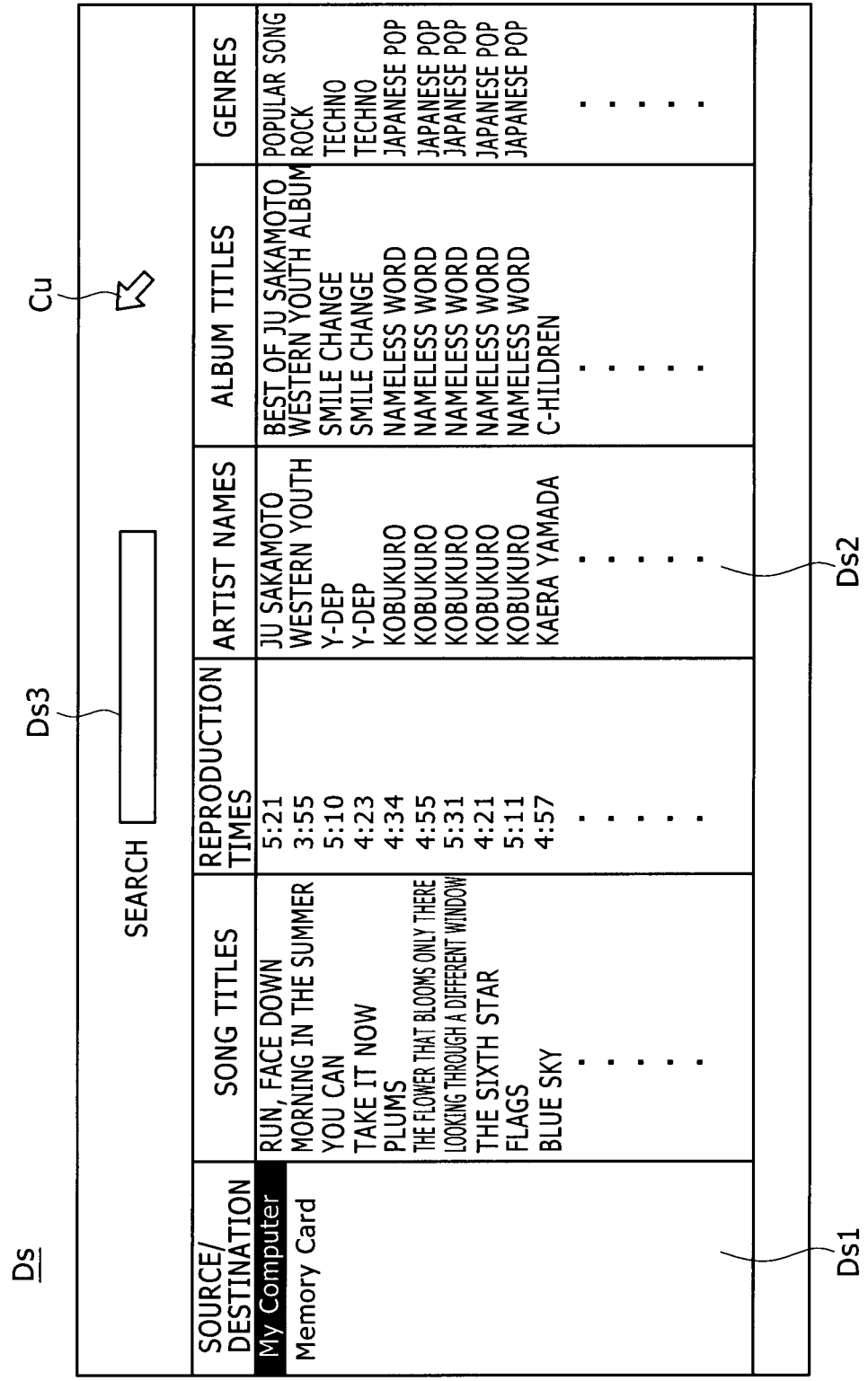
FIG. 7 is a schematic view showing a structure (part 1) of an audio data transfer screen.
Figure 8:
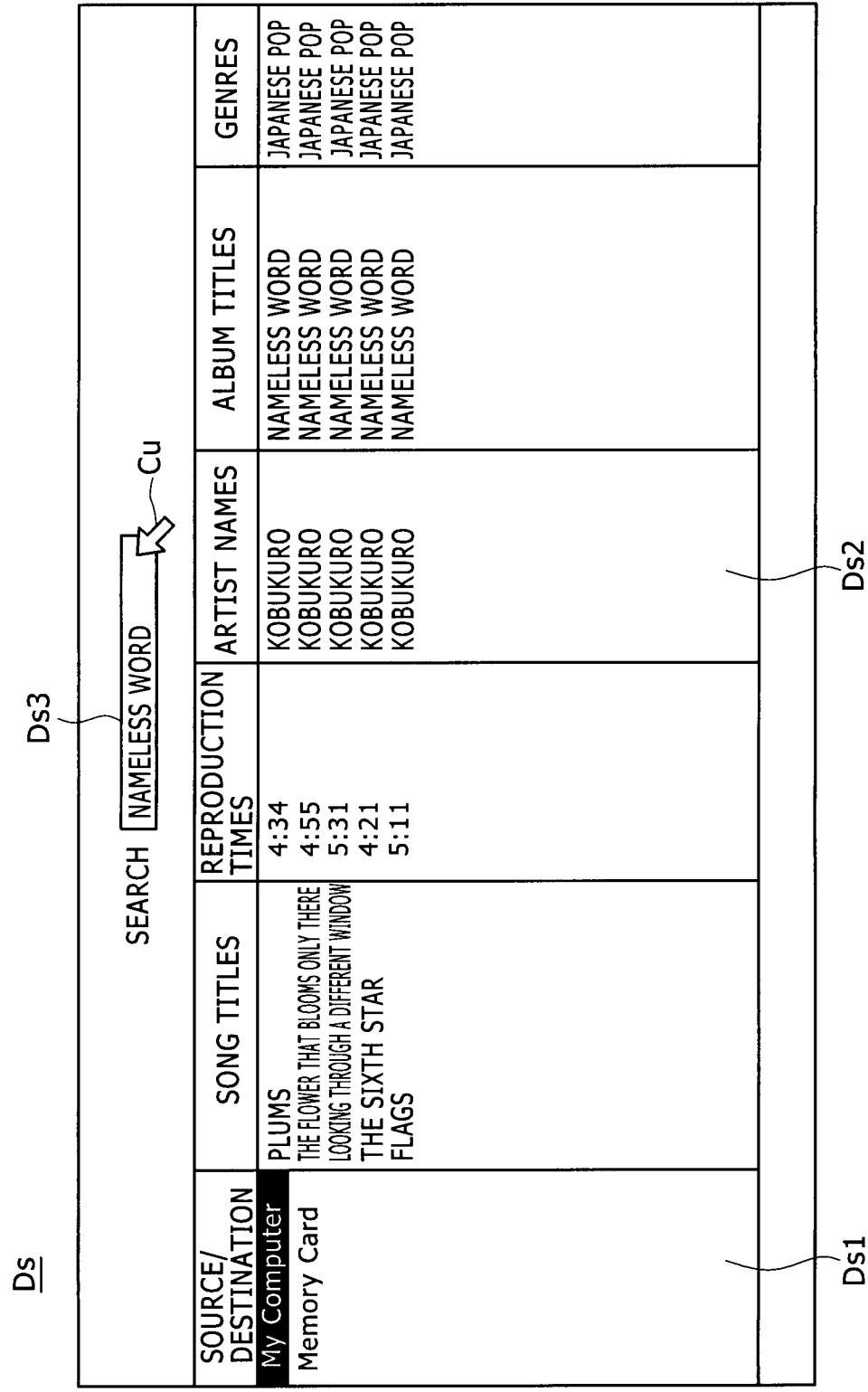
FIG. 8 is a schematic view showing the structure (part 2) of the audio data transfer screen.

Thereafter, the control unit 31 recognizes whether the user has operated an operation unit 34 with intent to execute an application for transferring illustratively audio data from a data storage unit 35 to the memory card 2. With the user's application-executing operation detected, the control unit 31 retrieves the application program from an internal storage unit, not shown, and causes a display unit 36 to display an audio data transfer screen Ds shown in FIG. 7 in accordance with the program.

The audio data transfer screen Ds is mainly formed by a source/destination list display area Ds1, a data list display area Ds2, and a search box Ds3. The source/destination list display area Ds1 displays in list form the name of the data storage device 3 serving as the source of the audio data to be transferred (e.g., "My Computer"), and the name of the memory card 2 acting as the destination of the transferred audio data (e.g., "Memory Card"). The data list display area Ds2 displays, in list form, related information (e.g., song title, reproduction time, artist name, album title, and genre) about each audio data item stored in the data storage unit 35 of the data storage device 3, or the related information about each audio data item written on the memory card 2. The search box Ds3 is a box into which to enter the condition for searching for audio data. Also indicated on the audio data transfer screen Ds is an arrow cursor Cu that can be moved across the screen by the user operating the operation unit 34 for pointing selectively to any one of the names in the source/destination list display area Ds1 or to any of the items of related information in the data list display area Ds2.

In practice, on the audio data transfer screen Ds immediately after its activation, the source/destination list display area Ds1 may show "My Computer" selected out of "My Computer" and "Memory Card," whereas the data list display area Ds2 may indicate a list of the related information about all audio data items stored in the selected "My Computer" (i.e., all audio data stored in the data storage unit 35 of the data storage device 3).

At this point, a search condition (e.g., album title) may be input to the search box Ds3. In that case, the data list display area Ds2 displays a list of only the related information matching the input search condition.

Figure 9:
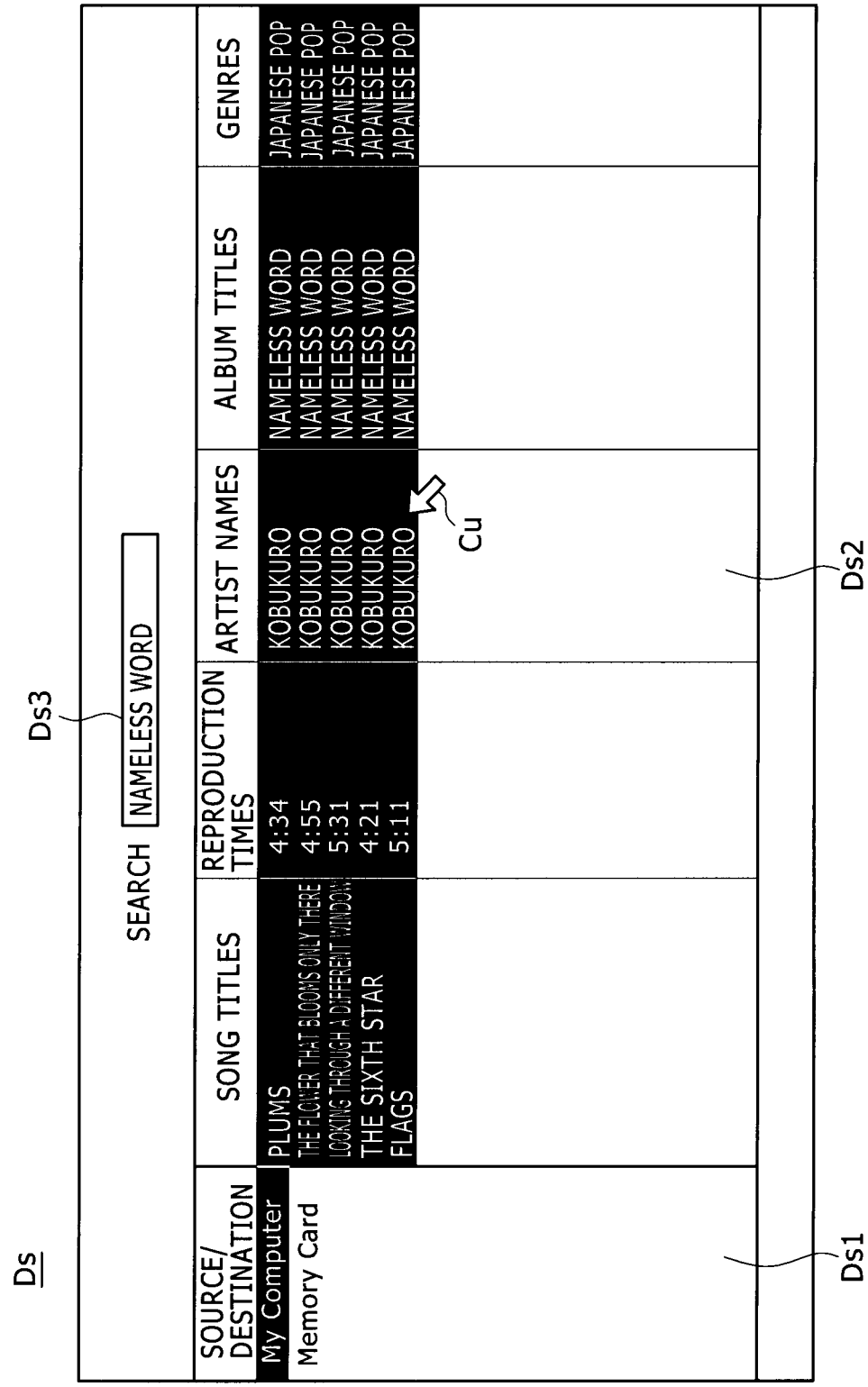
FIG. 9 is a schematic view showing the structure (part 3) of the audio data transfer screen.

Of what is displayed in the data list display area Ds2 as related information, the related information of the audio data to be transferred to the memory card 2 is selected (FIG. 9). Thereafter, "Memory Card" is selected from the source/destination list display area Ds1 indicating "My Computer" and "Memory Card." When a transfer command is selected from a menu window, not shown, the control unit 31 of the data storage device 3 starts transferring to the memory card 2 the audio data corresponding to the related information that has been selected.

At this point, the control unit 31 determines whether the audio codec type of the audio data to be transferred to the memory card 2 is decodable by the audio player 4 identified on the basis of the capability information file held on the memory card 2. If the audio codec type of the audio data to be transferred to the memory card 2 is found decodable by the audio player 4, then the control unit 31 reads the audio data in question from the data storage unit 35 and causes the memory controller 33 to write the retrieved data in its data format to the memory card 2.

If the audio codec type of the audio data to be transferred to the memory card 2 is not found decodable by the audio player 4, then the control unit 31 reads the audio data in question from the data storage unit 35, causes an encoding unit 37 to encode the retrieved data using an audio codec type decodable by the audio player 4, and controls the memory controller 33 to write the encoded data to the memory card 2. If there are a plurality of audio codec types decodable by the audio player 4 as shown in the capability information file of FIG. 3, the control unit 31 causes the data to be encoded using one of these multiple audio codec types.

Figure 10:
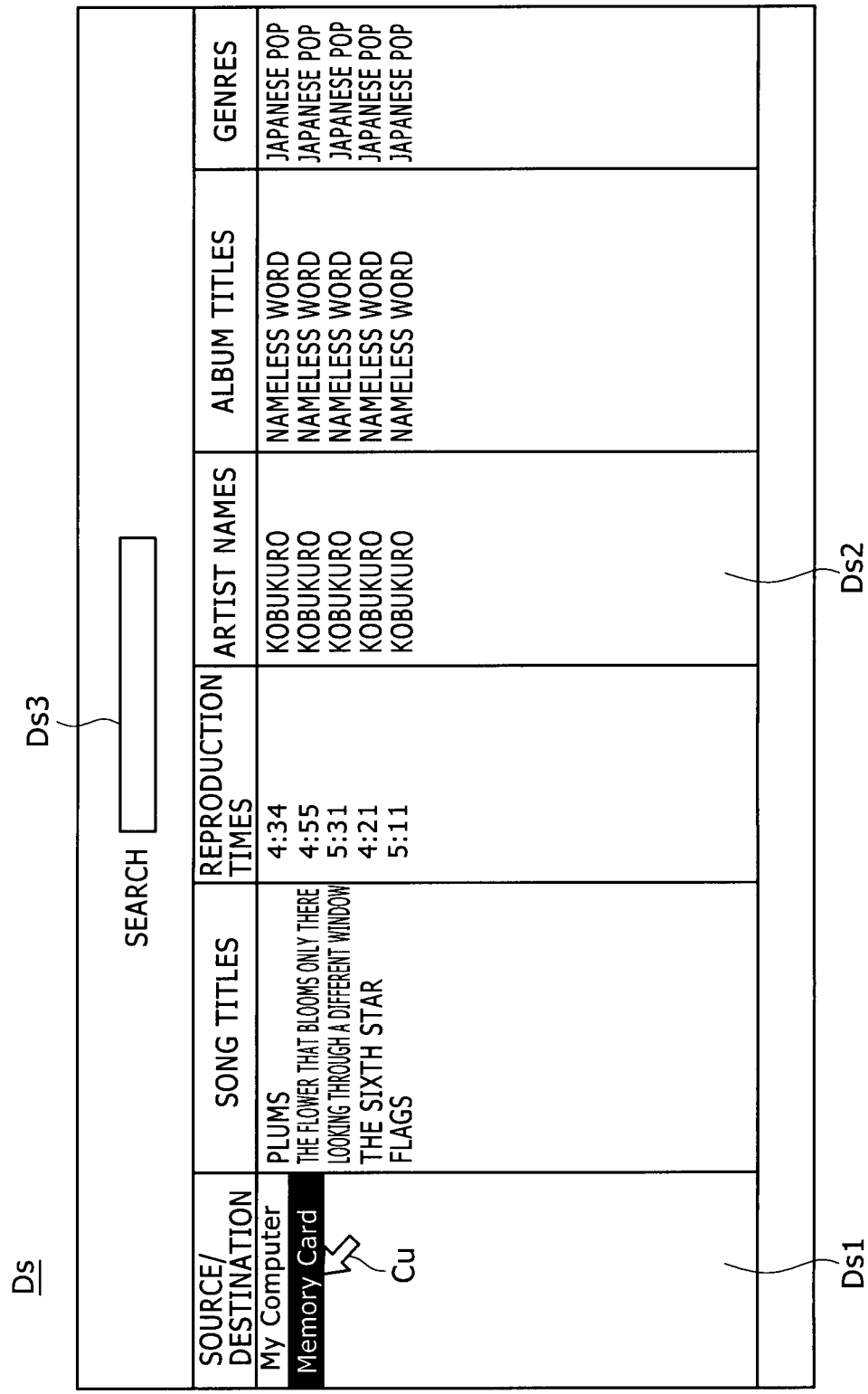
FIG. 10 is a schematic view showing the structure (part 4) of the audio data transfer screen.

After the audio data corresponding to the selected related information has all been written to the memory card 2, the control unit 31 terminates the audio data transfer procedure. As a result of this, the data list display area Ds2 displays a list of the related information about the audio data having been written to the memory card 2, as shown in FIG. 10.

As described, in accordance with the capability information file written on the memory card 2, the control unit 31 writes to the memory card 2 the audio data selected to be transferred to the card 2 through the use of the data format (audio codec type) decodable by the audio player 4 that is to receive the data by means of the memory card 2.

In the foregoing example, the memory card 2 was described as having been attached to the audio player 4 immediately before it is attached to the data storage device 3. Still, the processes performed by the data storage device 3 are the same where the memory card 2 was attached to the video player 5 immediately before it is removed from there and attached anew to the data storage device 3.

More specifically, based on the capability information file found written on the attached memory card 2, the control unit 31 of the data storage device 3 identifies the video codec type decodable by the video player 5 to which to deliver video data by means of the memory card 2. If the video codec type of the video data to be transferred to the memory card 2 is found decodable by the video player 5, the control unit 31 writes the video data in question in its data format to the memory card 2. If the video codec type is not found decodable by the video player 5, then the control unit 31 causes the encoding unit 37 to encode the video data in question using a video codec type decodable by the video player 5 before writing the encoded data to the memory card 2.

If no capability information is found written on the memory card 2, the control unit 31 may estimate a data format decodable by the terminal to which to deliver data via the memory card 2, on the basis of the data format of the data previously written on the attached memory card 2.

More specifically, if no capability information is found written on the memory card 2, the control unit 31 first controls the memory controller 33 to search the attached memory card 2 for previously written data. When such data is found as a result of the search, the control unit 3 acquires the data format of the data. If the acquired data format turns out to be the audio codec type of MP3 at 64 kbps, then the control unit 31 estimates that the audio codec type of MP3 at 64 kbps is the data format decodable by the terminal to which to deliver data by means of the memory card 2. The control unit 31 proceeds to write, say, the audio data selected to be transferred to the memory card 2, to the card 2 in the estimated data format (i.e., MP3 of 64 kbps).

Figure 11:
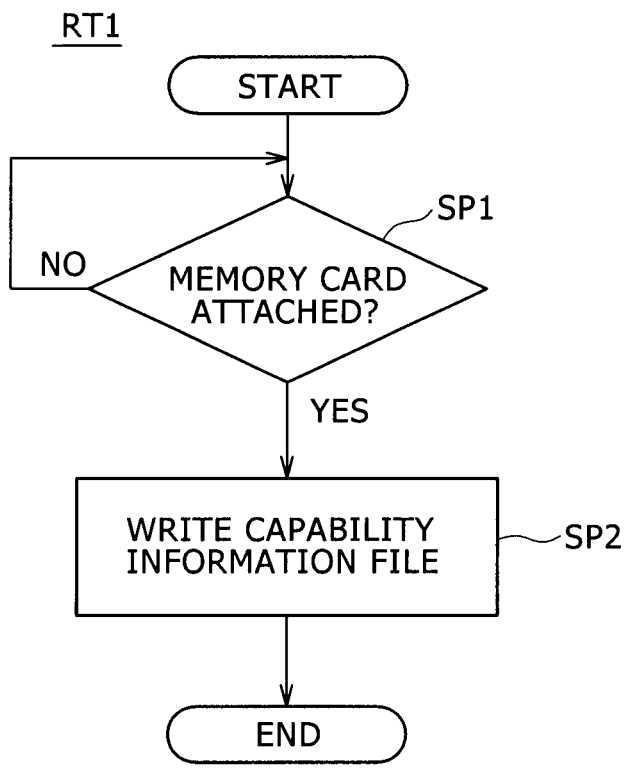
FIG. 11 is a flowchart of steps constituting a capability information writing procedure of a first embodiment of the present invention.

(1-3) Capability Information Writing Procedure and Data Writing Procedure of the First Embodiment What follows is a detailed description, with reference to the flowchart of FIG. 11, of how the audio player 4 and video player 5 write their capability information to the memory card 2 and how the data storage device 3 writes its data to the memory card 2.

First to be described with reference to the flowchart of FIG. 11 is a procedure RT1 performed by the audio player 4 and video player 5 for writing their capability information to the memory card 2 (the procedure will be called the capability information writing procedure RT1 hereunder). The capability information writing procedure RT1 is a procedure carried out by the control unit 11 of the audio player 4 in accordance with a program retrieved from an internal storage unit, not shown, as well as a procedure executed by the control unit 21 of the video player 5 in keeping with a program retrieved from an internal storage unit, not shown. For convenience of explanation, the capability information writing procedure RT1 performed by the control unit 11 of the audio player 4 alone will be described here.

Upon activation, the control unit 11 of the audio player 4 starts up the capability information writing procedure RT1 and goes to step SP1. In step SP1, the control unit 11 waits for the memory card 2 to be attached. When the memory card 2 is found attached, the control unit 11 goes to step SP2.

In step SP2, the control unit 11 reads capability information from the capability information memory 14, adds to the retrieved information a timestamp in effect at that point to create a capability information file, and writes the created file to the memory card 2 (any existing capability information file on the card 2 is overwritten with the newly created file). The control unit 11 then terminates the capability information writing procedure RT1.

By executing the capability information writing procedure RT1 as described, the control unit 11 of the audio player 4 writes the capability information file to the attached memory card 2.

Figure 12:
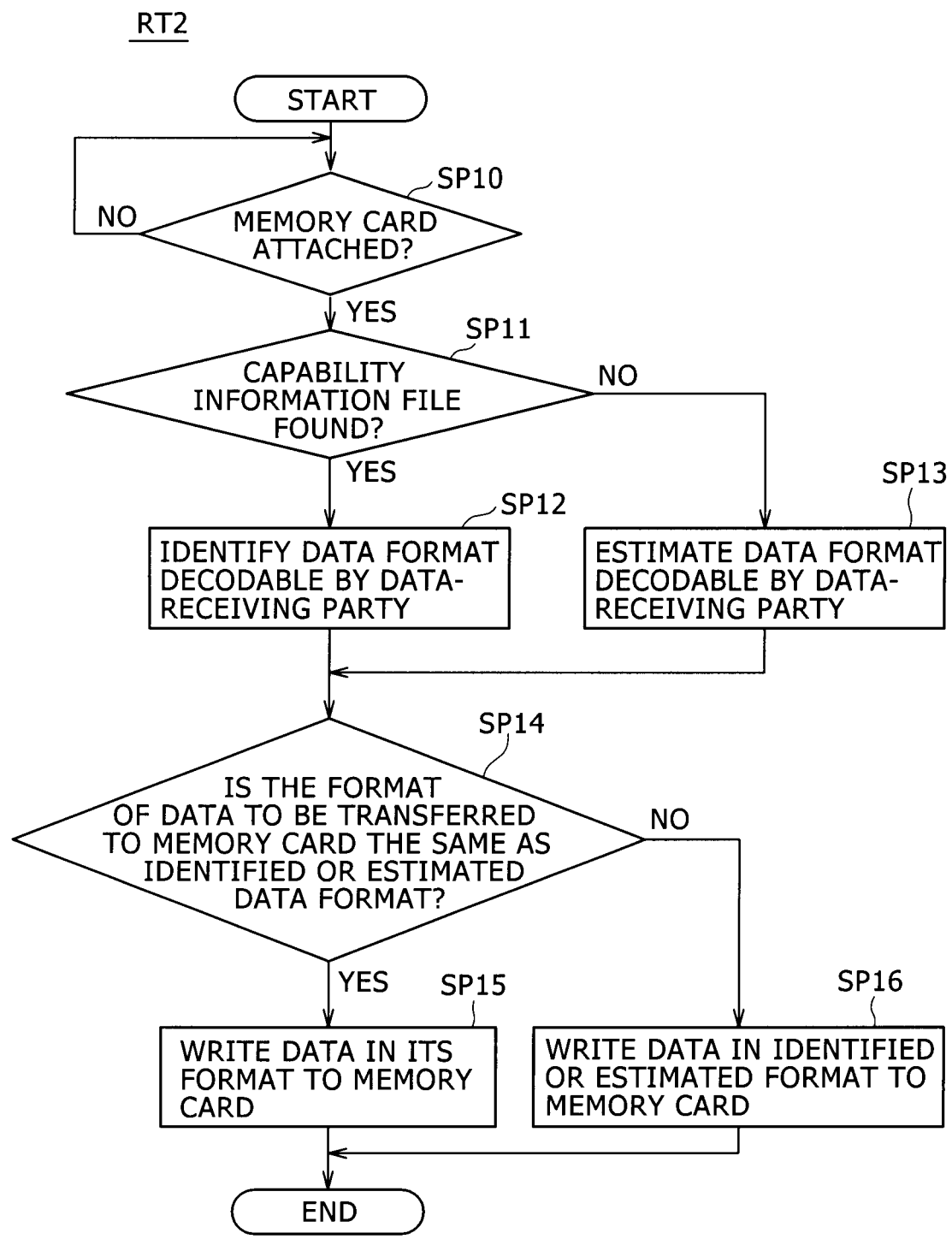
FIG. 12 is a flowchart of steps constituting a data writing procedure of the first embodiment.

Next to be described with reference to the flowchart of FIG. 12 is a procedure RT2 performed by the data storage device 3 for writing data to the memory card 2 (the procedure will be called the data writing procedure RT2 hereunder). The data writing procedure RT2 is a procedure carried out by the control unit 31 of the data storage device 3 in accordance with a program retrieved from an internal storage unit, not shown.

Upon activation, the control unit 31 of the data storage unit 3 starts up the data writing procedure RT2 and goes to step SP10. In step SP10, the control unit 31 waits for the memory card 2 to be attached. When the memory card 2 is found attached, the control unit 31 goes to step SP11.

In step SP11, the control unit 31 checks to determine whether a capability information file is written on the attached memory card 2. If any such capability information file is found written in step SP11, that means the memory card 2 was attached to the audio player 4 or video player 5 before the card 2 is removed from there and attached anew to the data storage device 3. In that case, the control unit 31 goes to step SP12.

In step SP12, the control unit 31 reads the capability information file from the memory card 2. Based on the capability information file this retrieved, the control unit 31 identifies the data format (audio codec type) decodable by the party (e.g., audio player 4) to which to deliver data via the memory card 2. With the decodable data format identified, the control unit 31 goes to step SP14.

If no capability information file is found written in step SP11, that means the memory card 2 was used on a terminal other than the audio player 4 or video player 5 before the memory card 2 is removed from there and attached to the data storage device 3. In this case, the control unit 31 goes to step SP13.

In step SP13, the control unit 31 searches the attached memory card 2 for previously written data. On the basis of the data format of the data found by the search, the control unit 31 estimates the data format decodable by the party that is to receive data by way of the memory card 2. With the decodable data format estimated, the control unit 31 goes to step SP14.

In step SP14, the control unit 31 checks to determine whether the data to be transferred to the memory card 2 is selected by the user. With the transfer object data selected, the control unit 31 checks to see if the data format of the selected data is the same as the data format identified in step SP12 or estimated in step SP13. If the result of the check in step SP14 is affirmative, that means the data format of the data to be transferred to the memory card 2 is decodable by the party that is to receive the transferred data via the memory card 2. At this point, the control unit 31 goes to step SP15. In step SP15, the control unit 31 writes the transfer object data in its data format to the memory card 2. The control unit 31 then terminates the data writing procedure RT2.

If the result of the check in step SP14 is negative, that means the data format of the data to be transferred to the memory card 2 is not decodable by the party to which to deliver data by means of the memory card 2. In this case, the control unit 31 goes to step SP16. In step SP16, the control unit 31 causes the encoding unit 37 to encode the data in a data format decodable by the data-receiving terminal before writing the encoded data to the memory card 2. The control unit 31 then terminates the data writing procedure RT2.

By executing the data writing procedure RT2 as described, the control unit 31 of the data storage device 3 writes data to the attached memory card 2.

(1-4) Operations and Effects of the First Embodiment

In the data delivery system 1 configured as described above, the memory card 2 may be first attached to the terminal that is to receive data by way of the memory card 2 (i.e., audio player 4 or video player 5). At that point, the terminal writes to the memory card 2 capability information indicating the data format decodable by this terminal with its reproducing capability.

The memory card 2 with the capability information written thereon may then be attached to the data storage device 3 that is to deliver data by means of the memory card 2. The data storage device 3 proceeds to write data to the memory card 2 using the data format indicated by the capability information written on the card 2.

In this manner, the data storage device 3 of the data delivery system 1 can write data to the memory card 2 using the data format decodable by the terminal to which the data is to be delivered by means of the card 2.

In short, with this data delivery system 1, the memory card 2 is first attached to the data-receiving terminal so that the terminal writes its capability information to the attached card 2. The memory card 2 is then removed from the terminal and attached anew to the data storage device 3 that is to deliver data. Based on the capability information found written on the memory card 2, the data storage device 3 identifies the data format decodable by the data-receiving terminal and writes data to the memory card 2 using the identified data format. This makes it possible for the data storage device 3 to deliver its data to the target terminal via the memory card 2 using the data format decodable by the terminal, without bothering the user to perform complicated operations.

Even if no capability information is found written on the memory card 2, the data storage device 3 of the data delivery system 1 checks the data format of the data previously written on the memory card in order to estimate the data format decodable by the data-receiving terminal. With the decodable data format estimated, the data storage device 3 may write its data to the memory card 2 according to the estimated format.

The data delivery system 1 is configured in such a manner that capability information and data are exchanged between the data storage device 3 on the one hand and the audio player 4 or video player 5 on the other hand by means of the memory card 2. There is no need for the data storage device 3 or the terminal to have a communication capability to exchange the capability information therebetween. This makes it possible to devise a simply structured data delivery system.

Where the above-described structures are in use, the memory card 2 may be first attached to the terminal. The capability information indicating the data format decodable by the terminal is then written to the memory card 2. The memory card 2 with the capability information written thereon is removed from the terminal and attached to the data storage device 3. In turn, the data storage device 3 writes its data to the attached memory card 2 using the data format corresponding to the capability information found written on the card 2. That is, the data storage device 3 that is to deliver data to the terminal via the memory card 2 identifies the data format decodable by the terminal and writes the data to the card 2 using the identified decodable data format. This makes it possible to deliver target data to the data-receiving party by means of the memory card 2 in a data format that can be reliably decoded by that party.

(2) Second Embodiment

The second embodiment of the present invention will now be described in detail. This is an embodiment whereby capability information and data are written using procedures different from those of the above-described first embodiment. Only the procedures are different; the system configuration, the structures of the terminals (audio player 4 and video player 5), and the structure of the data storage device 3 are assumed to be substantially the same as those of the first embodiment.

What makes the data delivery system 1 of the second embodiment different from that of the first embodiment is this: that the terminal may additionally write a capability information file to the memory card 2, as opposed to the first embodiment in which the existing capability information file on the memory card 2 is overwritten with a new file by the terminal.

Figure 13:
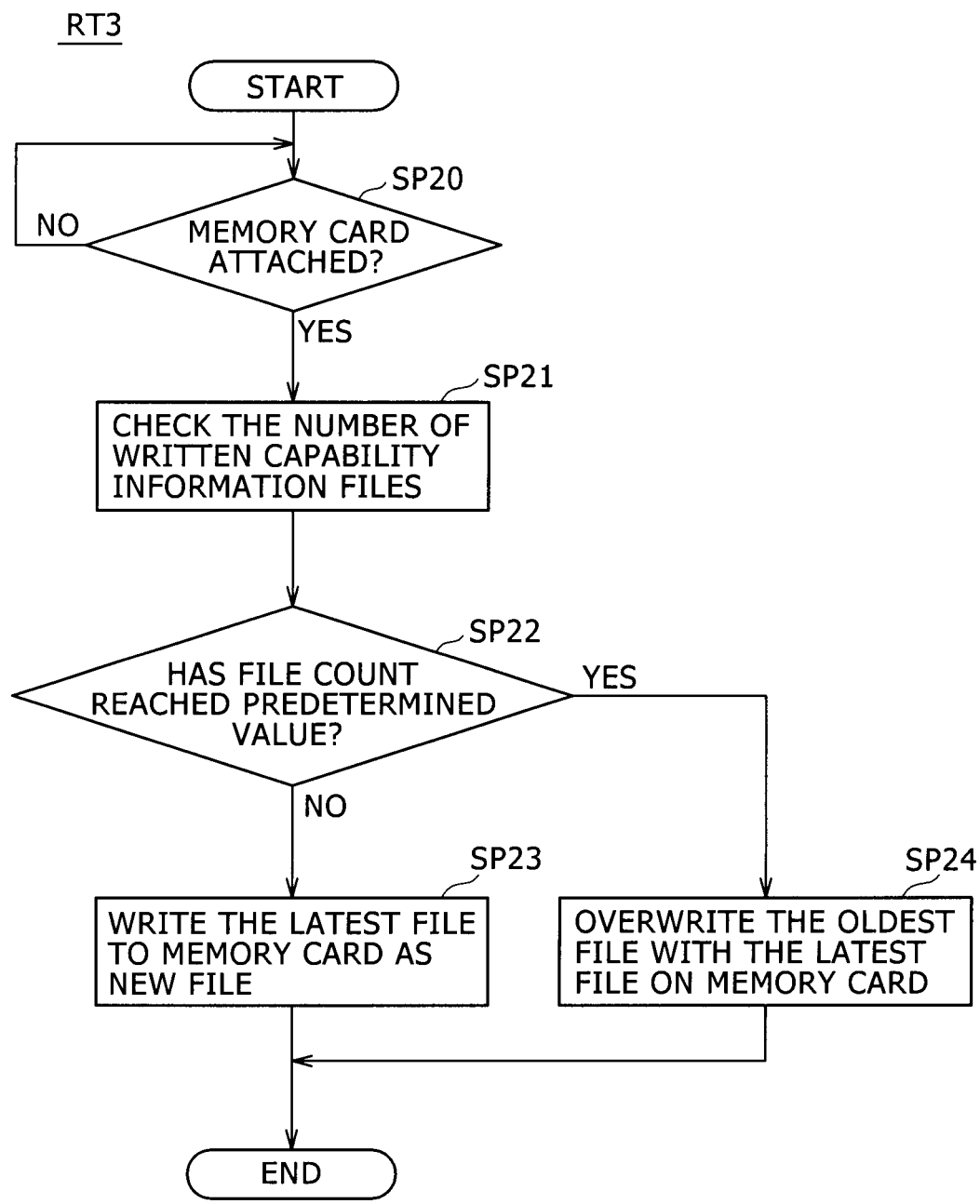
FIG. 13 is a flowchart of steps constituting a capability information writing procedure of a second embodiment of the present invention.

Described below with reference to the flowchart of FIG. 13 is a procedure RT3 performed by the audio player 4 or video player 5 for writing capability information to the memory card 2. The capability information writing procedure RT3 is a procedure carried out by the control unit 11 of the audio player 4 in accordance with a program retrieved from an internal storage unit, not shown, as well as a procedure executed by the control unit 21 of the video player 5 in keeping with a program retrieved from an internal storage unit, not shown. For convenience of explanation, the capability information writing procedure RT3 performed by the control unit 11 of the audio player 4 alone will be described here.

Upon activation, the control unit 11 of the audio player 4 starts up the capability information writing procedure RT3 and goes to step SP20. In step SP20, the control unit 11 waits for the memory card 2 to be attached. When the memory card 2 is found attached, the control unit 11 goes to step SP21.

In step SP21, the control unit 11 checks the number of capability information files previously written on the memory card 2. The control unit 11 then goes to step SP22.

In step SP22, the control unit 11 checks to determine whether the number of previously written capability information files has reached a predetermined value. The predetermined value represents a maximum number (e.g., 10) of capability information files allowed to be stored on the memory card 2. If the result of the check in step SP22 is negative, that means the number of capability information files stored on the memory card 2 has yet to reach the upper limit. In that case, the control unit 11 goes to step SP23.

In step SP23, the control unit 11 reads capability information from the capability information memory 14, adds a timestamp in effect at that point to the retrieved capability information to create the latest capability information file, and writes to the memory card 2 the newly created file independently of the capability information files previously written on the card 2. The control unit 11 then terminates the capability information writing procedure RT3.

If the result of the check in step SP22 is affirmative, that means the number of capability information files found written on the memory card 2 has reached the upper limit. In that case, the control unit 11 goes to step SP24.

In step SP24, the control unit 11 reads capability information from the capability information memory 14, adds a timestamp in effect at that point to the retrieved capability information to create the latest capability information file, and overwrites the oldest of the existing capability information files (as many as 10 in this example) with the newly created file. The control unit 11 then terminates the capability information writing procedure RT3.

By executing the capability information writing procedure RT3 as described, the control unit 11 of the audio player 4 writes the capability information file to the attached memory card 2.

Figure 14:
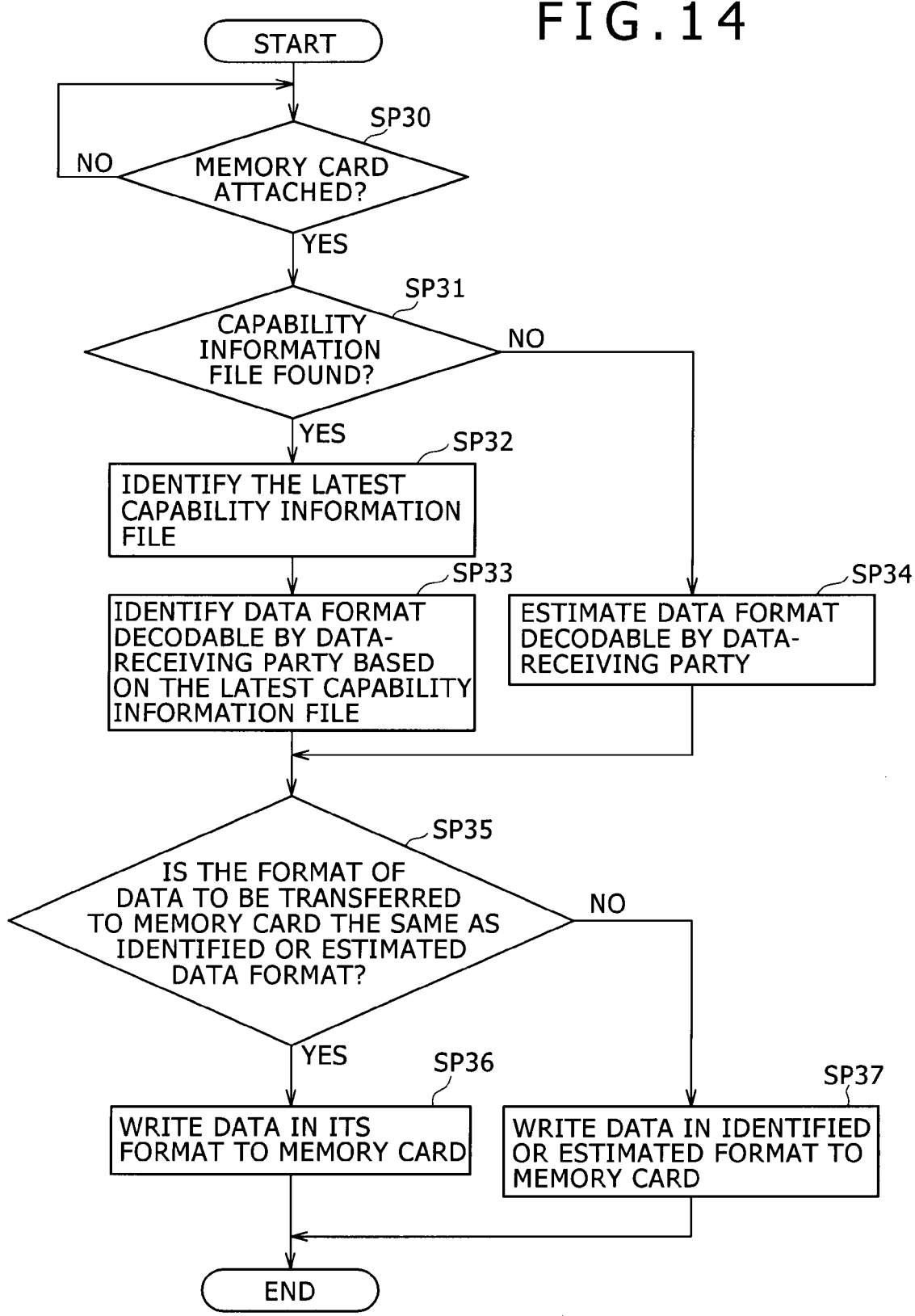
FIG. 14 is a flowchart of steps constituting a data writing procedure of the second embodiment.

Next to be described with reference to the flowchart of FIG. 14 is a procedure RT4 performed by the data storage device 3 for writing data to the memory card 2. The data writing procedure RT4 is a procedure carried out by the control unit 31 of the data storage device 3 in accordance with a program retrieved from an internal storage unit, not shown.

Upon activation, the control unit 31 of the data storage unit 3 starts up the data writing procedure RT4 and goes to step SP30. In step SP30, the control unit 31 waits for the memory card 2 to be attached. When the memory card 2 is found attached, the control unit 31 goes to step SP31.

In step SP31, the control unit 31 checks to determine whether at least one capability information file is written on the attached memory card 2. If the result of the check in step S31 is affirmative, that means the memory card 2 was attached at least once to the audio player 4 or video player 5 before the card 2 is attached to the data storage device 3. At this point, the control unit 31 goes to step SP32.

In step SP32, the control unit 31 controls the memory controller 33 to identify and read the most recently timestamped of the capability information files written on the memory card 2. With the latest capability information file identified and retrieved, the control unit 31 goes to step SP33.

In step SP33, based on the last capability information file, the control unit 31 identifies the data format (audio codec type) decodable by the party (e.g., audio player 4) to which to deliver data by means of the memory card 2. With the decodable data format identified, the control unit 31 goes to step SP35.

If the result of the check in step SP31 is negative, that means the memory card 2 was never attached to the audio player 4 or video player 5 and may well have been used on some other terminal before the card 2 is attached to the data storage device 3. In this case, the control unit 31 goes to step SP34.

In step SP34, the control unit 31 searches the attached memory card 2 for previously written data. On the basis of the data format of the data found by the search, the control unit 31 estimates the data format decodable by the terminal to which to deliver data via the memory card 2. With the decodable data format estimated, the control unit 31 goes to step SP35.

In step SP35, the control unit 31 waits for the user to select the data to be transferred to the memory card 2. Following the data selection by the user, the control unit 31 checks to determine whether the data format of the data to be transferred is the same as the data format identified in step SP33 or estimated in step SP34. If the result of the check in step SP35 is affirmative, that means the data format of the data to be transferred to the memory card 2 is decodable by the terminal to which to deliver the data by means of the memory card 2. In this case, the control unit 31 goes to step SP36. In step SP36, the control unit 31 writes the transfer object data in its data format to the memory card 2. The control unit 31 then terminates the data writing procedure RT4.

If the result of the check in step SP35 above turns out to be negative, that means the data format of the data to be transferred to the memory card 2 is not decodable by the terminal to which to deliver the data by way of the memory card 2. In this case, the control unit 31 goes to step SP37. In step SP37, the control unit 31 causes the encoding unit 37 to encode the transfer object data in a data format decodable by the target terminal before writing the encoded data to the memory card 2. The control unit 31 then terminates the data writing procedure RT4.

By executing the data writing procedure RT4 as described, the control unit 31 of the data storage device 3 writes the target data to the attached memory card 2.

In the data delivery system 1 of the second embodiment configured as described above, the memory card 2 may be first attached to the terminal (i.e., audio player 4 or video player 5) that is to receive data by means of the memory card 2. The terminal then checks the number of capability information files previously written on the attached memory card 2. If the number of previously written capability information files is found less than a predetermined value, then the latest capability information file is additionally written to the memory card 2. If the capability information file count is found to have preached the predetermined value, then the oldest of the capability information files previously written on the memory card 2 is overwritten with the latest capability information file.

The data delivery system 1 of the second embodiment is typically used in conjunction with the memory card 2 composed of a flash memory which has a plurality of storage areas each subject to the maximum guaranteed number of data writes tolerated. This setup makes it possible to let the capability information file in a particular storage area of the memory be overwritten with a new capability information file as few times as possible. As a result of this, the service life of the memory card 2 can be appreciably prolonged.

Because an upper limit is set on the number of capability information files that may be written to the memory card 2, a sufficiently large capacity of the memory card 2 is made available.

(3) Third Embodiment

The third embodiment of the present invention will now be described in detail. This is an embodiment whereby capability information and data are written using procedures different from those of the above-described second embodiment. Only the procedures are different; the system configuration, the structures of the terminals (audio player 4 and video player 5), and the structure of the data storage device 3 are assumed to be substantially the same as those of the second embodiment.

What makes the data delivery system 1 of the third embodiment different from that of the second embodiment is this: that when the memory card 2 is attached to the terminal, the terminal updates an existing capability information file on the attached card if that file contains the terminal identification information (i.e., a model name combined with a nickname) of this terminal; and that if no such capability information file is found written on the memory card 2, the terminal additionally writes a capability information file containing the terminal identification information of this terminal to the memory card 2. This feature contrasts the third embodiment with the second embodiment whereby a new capability information file is written additionally to the memory card 2 or is written to replace an existing capability information file depending on the number of capability information files previously written on the memory card 2.

Furthermore, if a plurality of capability information files are found written on the memory card 2, the data delivery system 1 of the third embodiment is arranged to let data be written to the memory card 2 in the data format indicated by the capability information file selected by the user. This arrangement further contrasts the third embodiment with the second embodiment whereby data is written to the memory card 2 in the data format indicated by the most recent of the multiple capability information files found written on the memory card 2.

Figure 15:
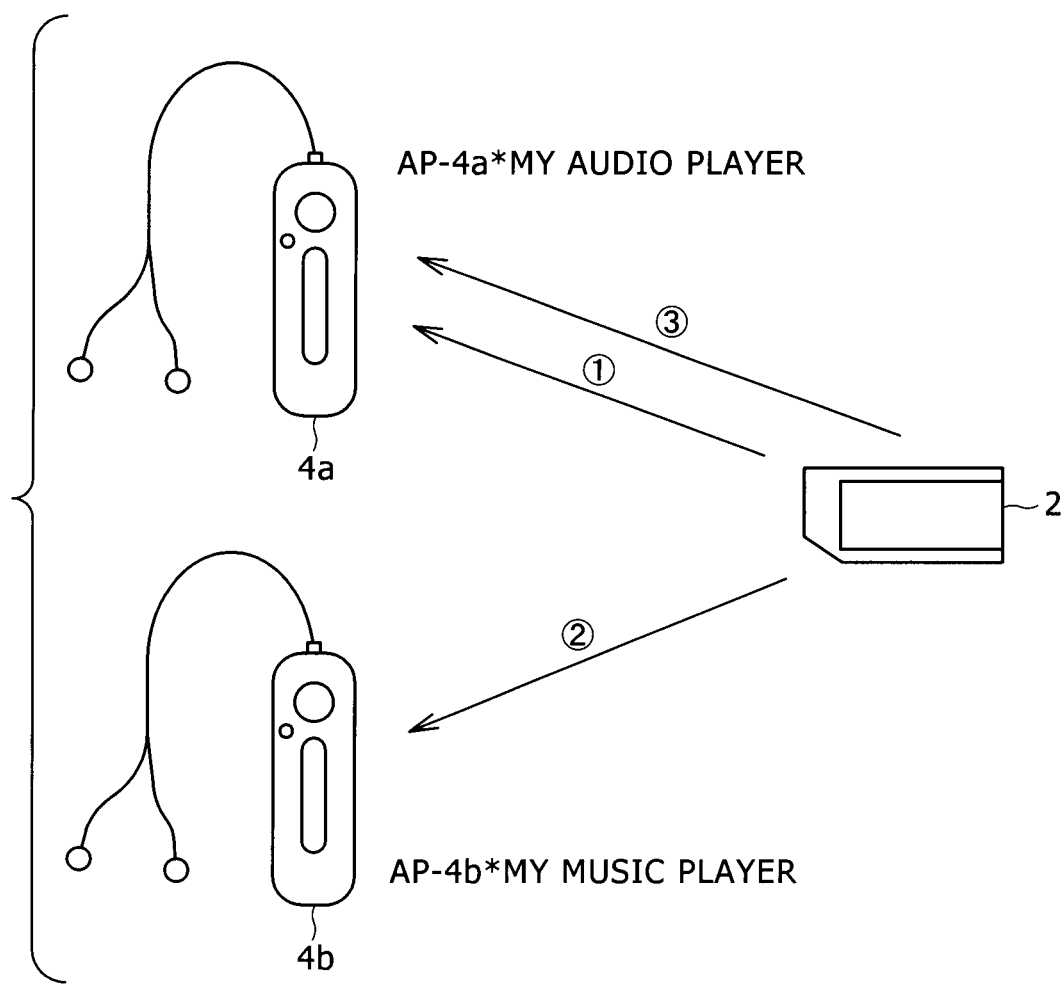
FIG. 15 is a schematic view showing how a memory card is typically attached according to a third embodiment of the present invention.

For convenience of explanation, it is assumed for the third embodiment that the memory card 2 is first attached to an audio player 4a identified by the model name "AP-4a*" and by the nickname "MY AUDIO PLAYER," that the memory card 2 is then attached to another audio player 4b identified by the model name "AP-4b*" and by the nickname "MY MUSIC PLAYER," and that the memory card 2 is eventually attached again to the audio player 4a, as illustrated in FIG. 15.

It is also assumed that the audio players 4a and 4b each have the same structure as the audio player 4 shown in FIG. 2. These two audio players may each be assigned a different data format or formats decodable by the audio decoding unit 16 of each player.

The memory card 2 is first attached to the audio player 4a identified by the model name "AP-4a*" and by the nickname "MY AUDIO PLAYER." In turn, the control unit 11 of the audio player 4a finds that no capability information file is written on the attached memory card 2. The control unit 11 proceeds to write to the memory card 2 a capability information file containing the terminal identification information of this terminal.

The memory card 2 is then attached to another audio player 4b identified by the model name "AP-4b*" and by the nickname "MY MUSIC PLAYER." The control unit 11 of the audio player 4b finds that although the capability information file containing the terminal identification information of another terminal (i.e., audio player 4a) is written on the attached memory card 2, there is no capability information file having the identification information of this terminal (i.e., model name "AP-4b*" and nickname "MY MUSIC PLAYER"). At this point, the control unit 11 additionally writes to the memory card 2 a capability information file having the identification information of this terminal.

Thereafter, the memory card 2 is again attached to the audio player 4a. The control unit 11 of the audio player 4a finds that the capability information file containing the identification information of this terminal is already written on the attached memory card 2. The control unit 11 proceeds to update the recorded date and time (i.e., timestamp) in the timestamp part X3 of this capability information file.

As a result of the above process, the memory card 2 has two capability information files written thereon: a capability information file containing the terminal identification information of the audio player 4a, and another capability information file having the terminal identification information of the audio player 4b.

As described, the data delivery system 1 of the third embodiment typically allows the memory card 2 to retain one capability information file regarding each of the terminals to which the card 2 was previously attached.

Figure 16:
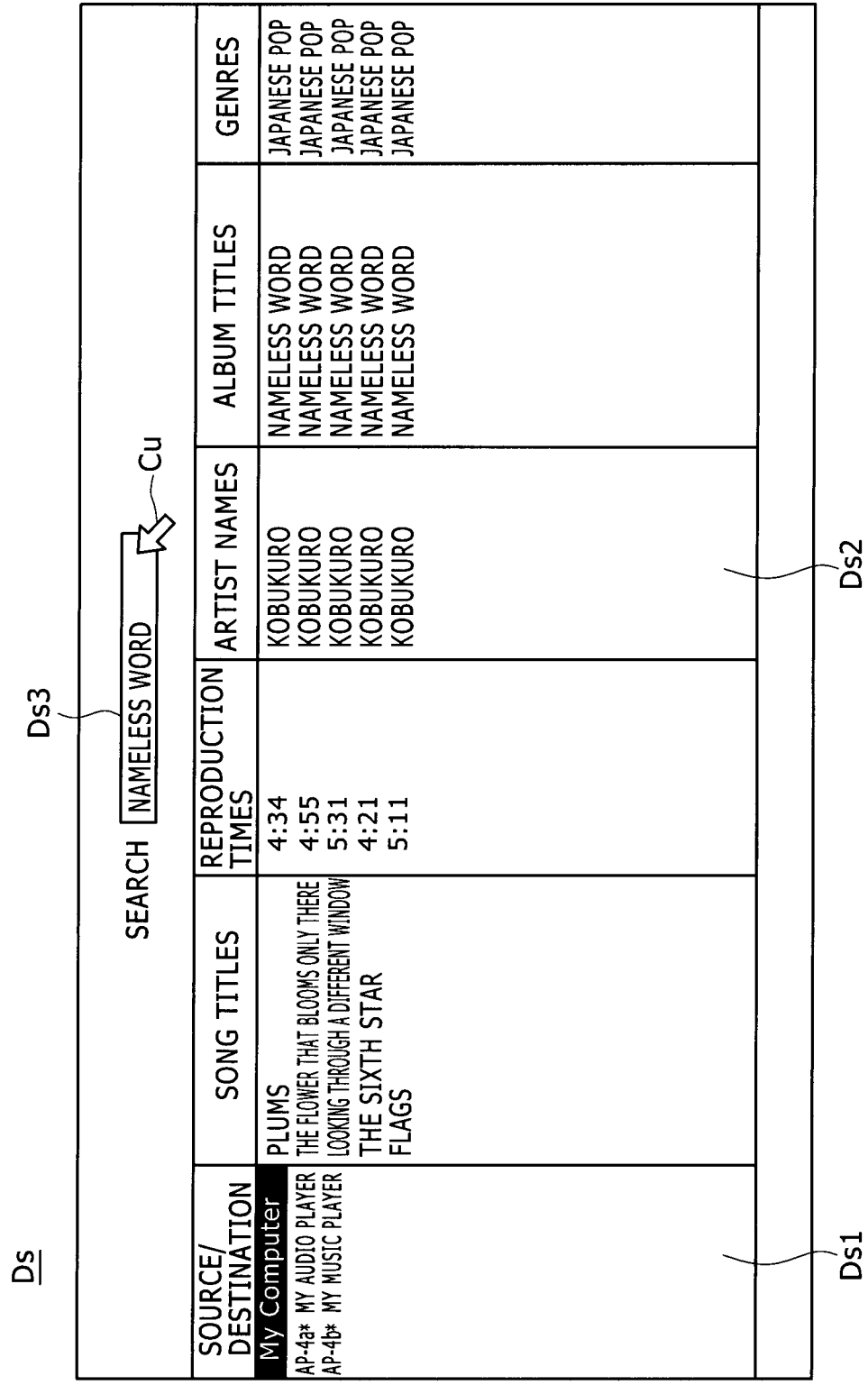
FIG. 16 is a schematic view showing a structure of an audio data transfer screen according to the third embodiment.

The memory card 2 is subsequently attached to the data storage device 3. The control unit 31 of the data storage device 3 recognizes whether the user has operated the operation unit 34 in order to execute an application for transferring illustratively audio data from the data storage device 3 to the attached memory card 2. With the user's application-executing operation detected, the control unit 31 retrieves the application program from an internal storage unit, not shown, and causes the display unit 36 to display the audio data transfer screen Ds shown in FIG. 16 in accordance with the program.

In the source/destination list display area Ds1 of the audio data transfer screen Ds, the control unit 31 displays in list form the name of the data storage device 3 as the source from which to transfer audio data (e.g., "My Computer"), and the terminal identification information contained in each of the two capability information files written on the memory card 2 as candidate destinations to which to transfer audio data. More specifically, the source/destination list display area Ds1 indicates "My Computer" as well as "AP-4a*MY AUDIO PLAYER" and "AP-4b*MY MUSIC PLAYER" representative of the terminals to which to deliver data by means of the memory card 2.

With "My Computer" displayed as selected in the source/destination list display area Ds1, the related information about the audio data to be transferred to the memory card 2 is selected from what is displayed in the data list display area Ds2. The terminal identification information of one terminal (e.g., "AP-4a*MY AUDIO PLAYER") is then selected from what is displayed in the source/destination display area Ds1. When the transfer command is selected from a menu window, not shown, the control unit 31 of the data storage device 3 starts transferring to the memory card 2 the audio data corresponding to the related information that has been selected.

At this point, the control unit 31 writes to the memory card 2 the audio data selected to be transferred in the audio codec type indicated by the selected capability information file containing the terminal identification information (e.g., "AP-4a*MY AUDIO PLAYER"), one of the two capability information files written on the memory card 2.

In the data delivery system 1 of the third embodiment, as described above, the data storage device 3 writes to the memory card 2 the audio data selected to be transferred to the memory card, by use of the data format indicated by the capability information file containing the terminal identification information selected by the user out of the multiple capability information files written on the memory card 2.

Figure 17:
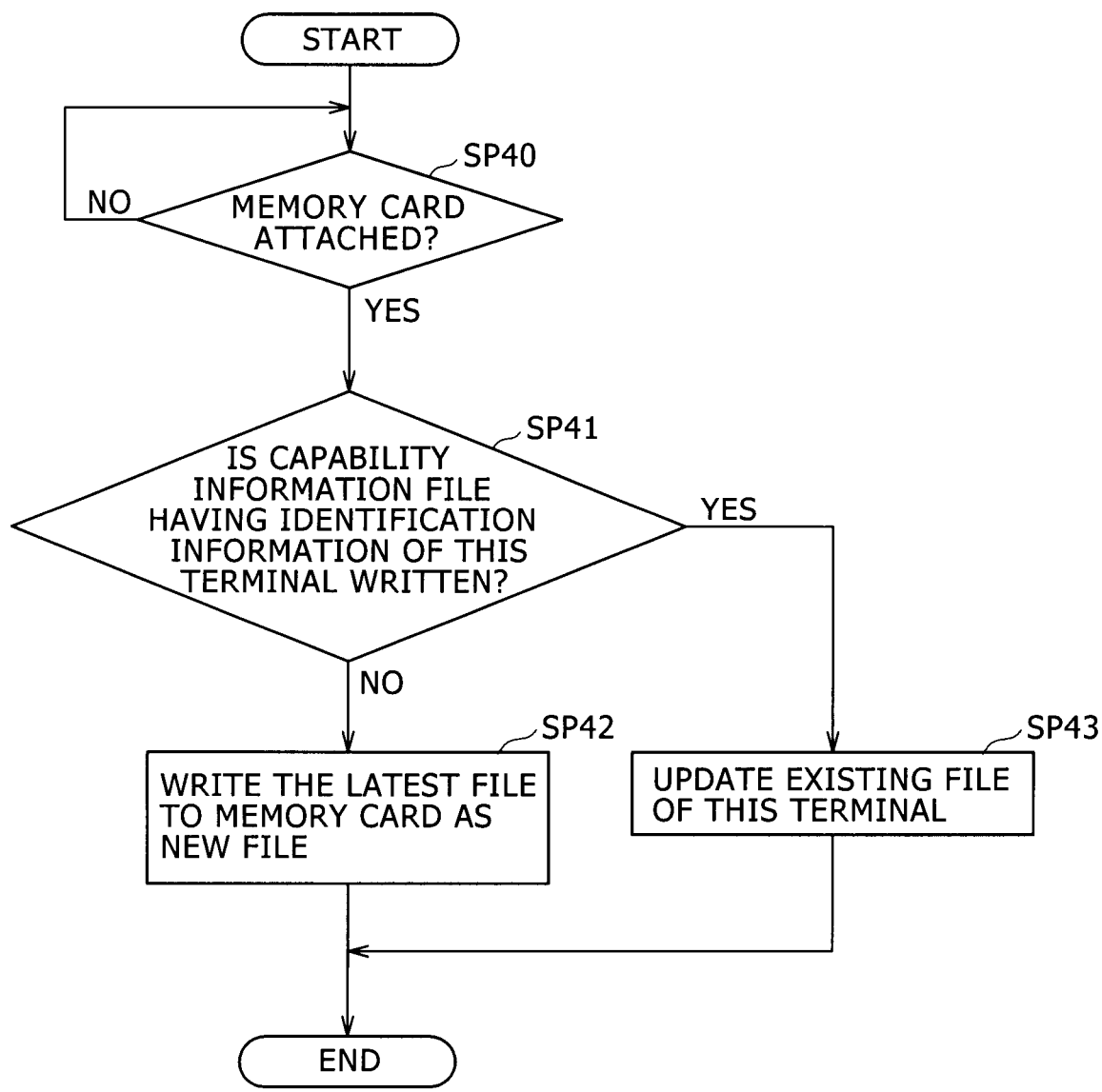
FIG. 17 is a flowchart of steps constituting a capability information writing procedure of the third embodiment.

Described below with reference to the flowchart of FIG. 17 is a procedure RT5 performed by the audio players 4a and 4b for writing their capability information to the memory card 2. The capability information writing procedure RT5 is a procedure carried out by the control unit 11 of the audio player 4a in accordance with a program retrieved from an internal storage unit, not shown, as well as a procedure executed by the control unit 11 of the audio player 4b in keeping with a program retrieved from an internal storage unit, not shown. For convenience of explanation, the capability information writing procedure RT5 performed by the control unit 11 of the audio player 4a alone will be described here.

Upon activation, the control unit 11 of the audio player 4a starts up the capability information writing procedure RT5 and goes to step SP40. In step SP40, the control unit 11 waits for the memory card 2 to be attached. When the memory card 2 is found attached, the control unit 11 goes to step SP41.

In step SP41, the control unit 11 checks to determine via the memory controller 13 whether a capability information file containing the terminal identification information of this terminal is written on the memory card 2. If the result of the check in step SP41 is negative, then the control unit 11 goes to step SP42. In step SP42, the control unit 11 reads capability information from the capability information memory 14, adds a timestamp in effect at that point to the retrieved capability information so as to create a capability information file having the terminal identification information of this terminal, and writes the newly created file to the memory card 2. The control unit 11 then terminates the capability information writing procedure RT5.

If the result of the check in step SP41 is affirmative, that means the memory card 2 was attached to the audio player 4a in the past and already has the capability information file containing the terminal identification information of this audio player 4a. In this case, the control unit 11 goes to step SP43.

In step SP43, the control unit 11 updates the timestamp (recorded date and time) of the capability information file containing the terminal identification information of this terminal found written on the memory card 2. The control unit 11 then terminates the capability information writing procedure RT5.

By executing the capability information writing procedure RT5 as described, the control unit 11 of the audio player 4a writes the capability information file to the attached memory card 2.

Figure 18:
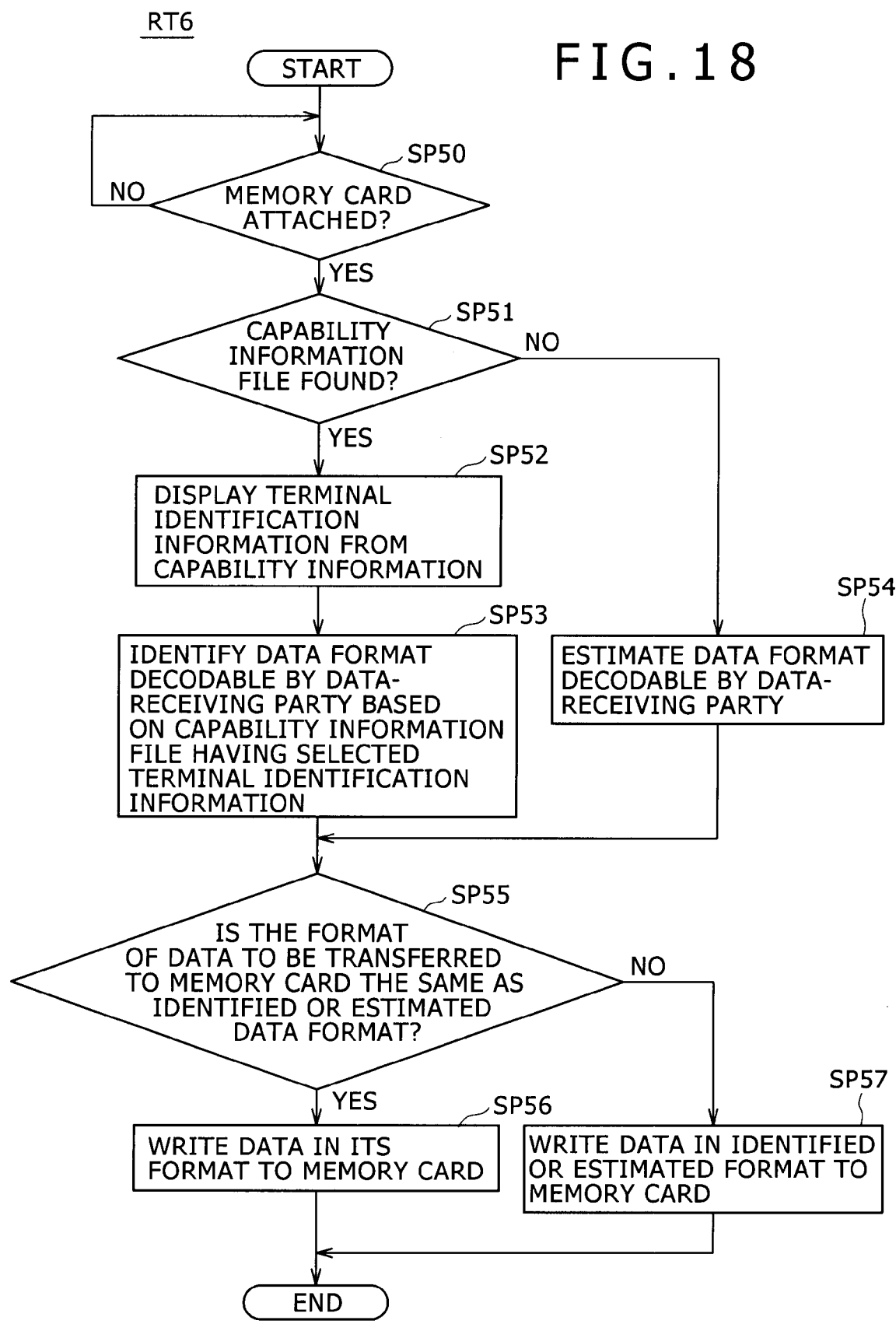
FIG. 18 is a flowchart of steps constituting a data writing procedure of the third embodiment.

Next to be described with reference to the flowchart of FIG. 18 is a procedure RT6 performed by the data storage device 3 for writing data to the memory card 2. The data writing procedure RT6 is a procedure carried out by the control unit 31 of the data storage device 3 in accordance with a program retrieved from an internal storage unit, not shown.

Upon activation, the control unit 31 of the data storage unit 3 starts up the data writing procedure RT6 and goes to step SP50. In step SP50, the control unit 31 waits for the memory card 2 to be attached. When the memory card 2 is found attached, the control unit 31 goes to step SP51.

In step SP51, the control unit 31 checks to determine whether at least one capability information file is written on the attached memory card 2. If the result of the check in step S51 is affirmative, then the control unit 31 goes to step SP52.

In step SP52, the control unit 31 controls the memory controller 33 to read all capability information files found written on the memory card 2 and causes the display unit 36 to display the terminal identification information described in each of the capability information files (i.e., in the source/destination list display area Ds1 of the audio data transfer screen Ds). Step SP52 is followed by step SP53.

In step SP53, based on the capability information file containing the terminal identification information selected by the user from the displayed terminal identification information, the control unit 31 determines the data format decodable by the terminal identified by the selected terminal identification information (i.e., terminal acting as the party to which to deliver data by means of the memory card 2). Step S53 is followed by step SP55.

If the result of the check in step SP51 is negative, then the control unit 31 goes to step SP54. In step SP54, the control unit 31 searches the attached memory card 2 for previously written data. In accordance with the data format of the data found by the search, the control unit 31 estimates the data format decodable by the terminal to which to deliver data by way of the memory card 2. Step SP54 is followed by step SP55.

In step SP55, the control unit 31 checks to determine whether the data format of the data selected by the user for transfer to the memory card 2 is the same as the data format determined in step SP53 or estimated in step SP54. If the result of the check in step SP55 is affirmative, that means the data format of the data to be transferred to the memory card 2 is decodable by the terminal to which to deliver the data by means of the memory card 2. In this case, the control unit 31 goes to step SP56 and writes the transfer object data in its data format to the memory card 2. The control unit 31 then terminates the data writing procedure RT6.

If the result of the check in step SP55 turns out to be negative, that means the data format of the data to be transferred to the memory card 2 is not decodable by the terminal to which to deliver the data by way of the memory card 2. In this case, the control unit 31 goes to step SP57 and causes the encoding unit 37 to encode the transfer object data in a data format decodable by the target terminal, before writing the encoded data to the memory card 2. The control unit 31 then terminates the data writing procedure RT6.

By executing the data writing procedure RT6 as described, the control unit 31 of the data storage device 3 writes the target data to the attached memory card 2.

In the data delivery system 1 of the third embodiment configured as described above, the memory card 2 may be first attached to the terminal (i.e., audio player 4a or 4b) that is to receive data by means of the memory card 2. The terminal then checks to determine whether the capability information file containing the terminal identification information of this terminal is already written on the attached memory card 2. If that capability information file is found written on the memory card 2, the terminal updates the timestamp of the file. If no such capability information file is found written on the memory card, the terminal writes anew a capability information file containing the terminal identification information of this terminal to the memory card 2. As a result of this, the memory card 2 retains one capability information file regarding each of the terminals to which the memory card 2 was attached in the past.

The capability information file, when created by the same terminal, remains the same except for the timestamp in the timestamp part X3 (i.e., date and time at which the capability information file was recorded) The data delivery system 1 of the third embodiment is arranged so that only one capability information file is retained per terminal. This feature allows the storage capacity of the memory card 2 to be used effectively.

Where a plurality of capability information files are found written on the memory card 2, the data delivery system 1 of the third embodiment allows the user to select one of the files. The system then allows data to be written to the memory card 2 in the data format indicated by the user-selected capability information file. In this manner, the user is given the freedom to select a desired capability information file (i.e., freedom to select the data format of the data to be written to the memory card 2). This feature improves the ease of use when data is to be transferred between two devices by means of the memory card 2.

Furthermore, the data delivery system 1 displays the terminal identification information contained in each of the capability information files written on the memory card 2, prompts the user to select desired terminal identification information thereby selecting the corresponding capability information file indirectly, and writes data to the memory card 2 in the data format indicated by the selected capability information file. The data delivery system 1 thus enables the user to select the data format decodable by the desired terminal, the selected data format being used to write data to the memory card 2.

(4) Fourth Embodiment

The fourth embodiment of the present invention will now be described in detail. This is an embodiment whereby data is written using a procedure different from that of the above-described second embodiment. Only the procedure is different; the system configuration, the structures of the terminals (audio player 4 and video player 5), and the structure of the data storage device 3 are assumed to be substantially the same as those of the second embodiment.

What makes the data delivery system 1 of the fourth embodiment different from that of the second embodiment is this: that when the memory card 2 with a plurality of capability information files written thereon is attached to the terminal, the terminal deletes from the memory card 2 all but the most recent capability information file. This feature contrasts the fourth embodiment with the second embodiment whereby a plurality of capability information files are left intact on the memory card 2.

Figure 19:
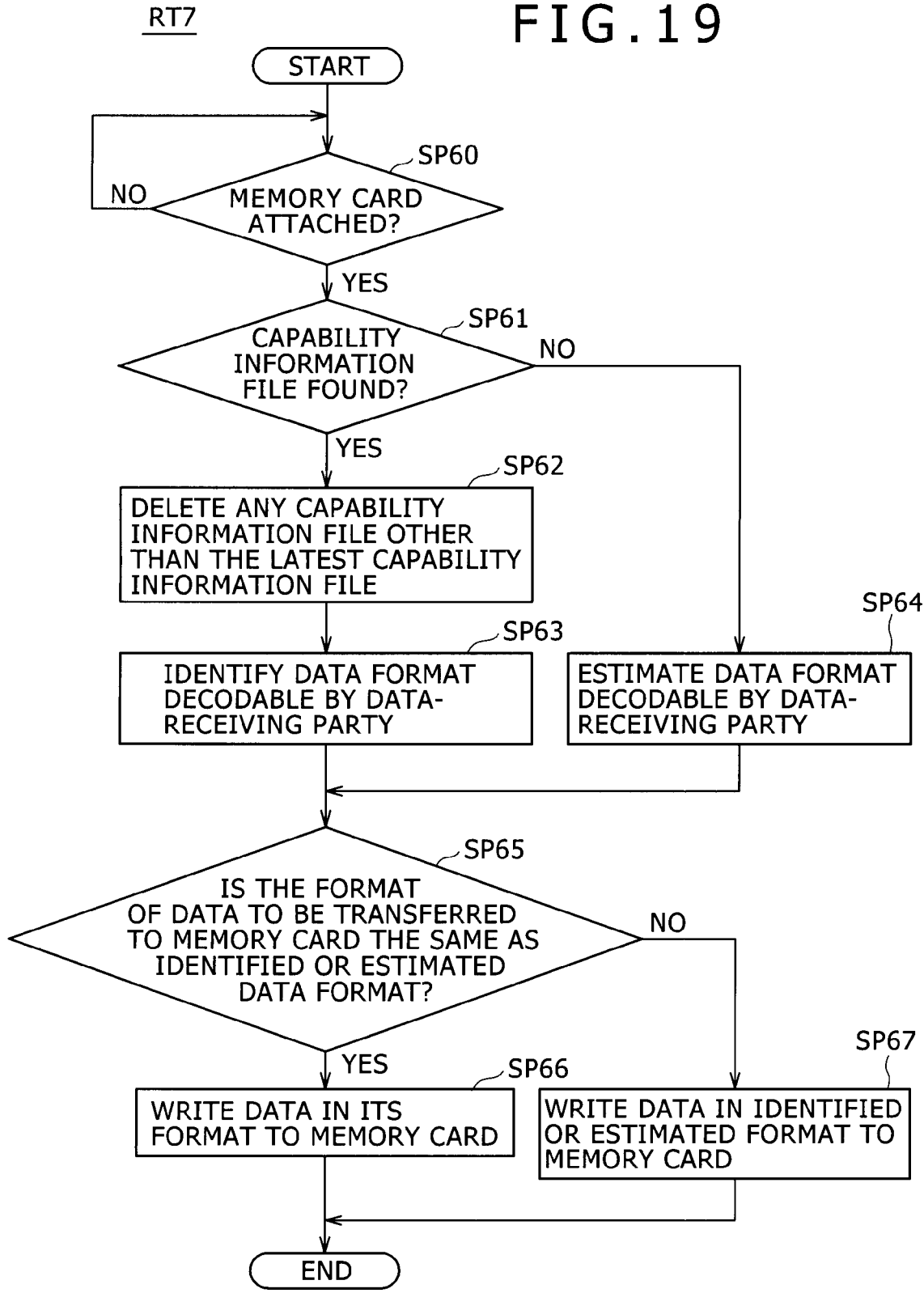
FIG. 19 is a flowchart of steps constituting a data writing procedure of a fourth embodiment of the present invention.

Described below with reference to the flowchart of FIG. 19 is a procedure RT7 performed by the data storage device 3 for writing data to the memory card 2. The data writing procedure RT7 is a procedure carried out by the control unit 31 of the data storage device 3 in accordance with a program retrieved from an internal storage unit, not shown.

Upon activation, the control unit 31 of the data storage unit 3 starts up the data writing procedure RT7 and goes to step SP60. In step SP60, the control unit 31 waits for the memory card 2 to be attached. When the memory card 2 is found attached, the control unit 31 goes to step SP61.

In step SP61, the control unit 31 checks to determine whether at least one capability information file is written on the attached memory card 2. If the result of the check in step S61 is affirmative, then the control unit 31 goes to step SP62.

In step SP62, the control unit 31 controls the memory controller 33 to delete from the memory card 2 all but the most recently timestamped capability information file (i.e., the latest capability information file). Step SP62 is followed by step SP63.

In step SP63, based on the latest capability information file, the control unit 31 identifies the data format decodable by the terminal to which to deliver data by means of the memory card 2. Step SP63 is followed by step SP65.

If the result of the check in step SP61 is negative, then the control unit 31 goes to step SP64. In step SP64, the control unit 31 searches the attached memory card 2 for previously written data. In accordance with the data format of the data found by the search, the control unit 31 estimates the data format decodable by the terminal to which to deliver data by means of the memory card 2. Step SP64 is followed by step SP65.

In step SP65, the control unit 31 checks that the data to be transferred to the memory card 2 has been selected by the user. When the selection of the data to be transferred is recognized, the control unit 31 checks to determine whether the data format of the transfer object data is the same as the data format identified in step SP63 or estimated in step SP64. If the result of the check in step SP65 is affirmative, that means the data format of the data to be transferred to the memory card 2 is decodable by the terminal to which to deliver the data by means of the memory card 2. In this case, the control unit 31 goes to step SP66. In step SP66, the control unit 31 writes the transfer object data in its data format to the memory card 2. The control unit 31 then terminates the data writing procedure RT7.

If the result of the check in step SP65 is negative, that means the data format of the data to be transferred to the memory card 2 is not decodable by the terminal to which to deliver the data by way of the memory card 2. In this case, the control unit 31 goes to step SP67. In step SP67, the control unit 31 causes the encoding unit 37 to encode the transfer object data in a data format decodable by the target terminal. The control unit 31 then terminates the data writing procedure RT7.

By executing the data writing procedure RT7 as described, the control unit 31 of the data storage device 3 writes the target data to the attached memory card 2.

In the data delivery system 1 of the fourth embodiment configured as described above, the memory card 2 with a plurality of capability information files written thereon may be attached to the data storage device 3. In turn, the data storage device 3 deletes from the attached memory card 2 all but the most recent capability information file.

That is, every time the memory card 2 is attached to the data storage device 3 of the data delivery system 1, the data storage device 3 deletes any capability information file other than the latest capability information file from the memory card 2. This feature is intended to avert the situation where the maximum number (e.g., 10) of capability information files are to be retained on the memory card. This enables the terminal to reduce the number of times a capability information file is overwritten with a new file on the memory card 2.

In practice, the overwriting of an existing capability information file involves first deleting the old file and then writing a new file in its place. As such, the operations involve a significantly higher processing load than if a capability information file is simply written anew. Furthermore, many terminals including the audio player 4 and video player 5 have lower processing capabilities than the data storage device. Under these circumstances, the processing time of the system as a whole can be shortened when the processing load on the terminal is lowered by reducing the number of times the existing capability information file is overwritten.

(5) Fifth Embodiment

The fifth embodiment of the present invention will now be described in detail. This is an embodiment whereby data is written using a procedure different from that of the above-described second embodiment. Only the procedure is different; the system configuration, the structures of the terminals (audio player 4 and video player 5), and the structure of the data storage device 3 are assumed to be substantially the same as those of the second embodiment.

What makes the data delivery system 1 of the fifth embodiment different from that of the second embodiment is this: that when a plurality of capability information files are written on the memory card 2, data is written to the memory card 2 in a data format common to all these files. This feature contrasts the fifth embodiment with the second embodiment whereby data is written to the memory card 2 in the data format indicated by the most recent of the multiple capability information files.

Figure 20:
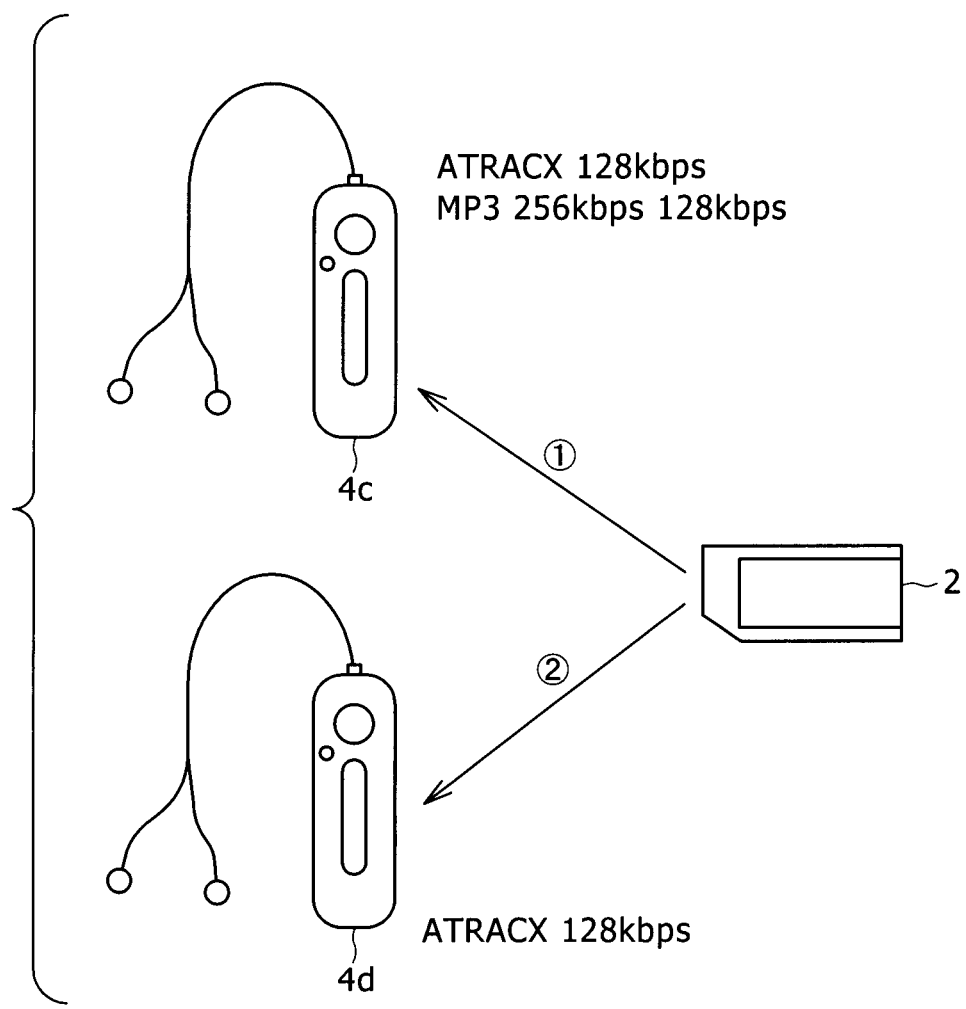
FIG. 20 is a schematic view showing how a memory card is attached according to a fifth embodiment of the present invention.

For convenience of explanation, it is assumed for the fifth embodiment that the memory card 2 is first attached to an audio player 4c and then to an audio player 4d as illustrated in FIG. 20.

The audio players 4c and 4d are each assumed to constitute a terminal having the same circuit structure as that of the audio player 4 shown in FIG. 2. It is further assumed that the data formats (audio codec types) decodable by the audio decoding unit 16 of the audio player 4c are ATRACX of 128 kbps and MP3 of 256 kbps and 128 kbps and that the data formats decodable by the audio decoding unit 16 of the audio player 4d are solely ATRACX of 128 kbps.

Given the above assumptions, the memory card 2 attached successively to the audio players 4c and 4d has come to retain a capability information file denoting ATRACX of 128 kbps and MP3 of 256 kbps and 128 kbps as the data formats decodable by the audio player 4c, and another capability information file designating ATRACX of 128 kbps as the data format decodable by the audio player 4d.

Subsequently, the memory card 2 is attached to the data storage device 3. In turn, the data storage device 3 reads all capability information files from the attached memory card 2 and selects a data format common to all the retrieved files. In this case, the data storage device 3 selects ATRACX of 128 kbps as the data format common to the two retrieved capability information files, one denoting ATRACX of 128 kbps and MP3 of 256 kbps and 128 kbps as the data formats decodable by the audio player 4c, the other file designating ATRACX of 128 kbps as the data format decodable by the audio player 4d.

The data storage device 3 proceeds to write to the attached memory card 2 the data selected by the user for transfer to the memory card 2.

With the data delivery system 1 of the fifth embodiment, as described above, the data storage device 3 writes to the attached memory card 2 user-selected data in the data format common to all capability information files found written on the memory card 2.

Figure 21:
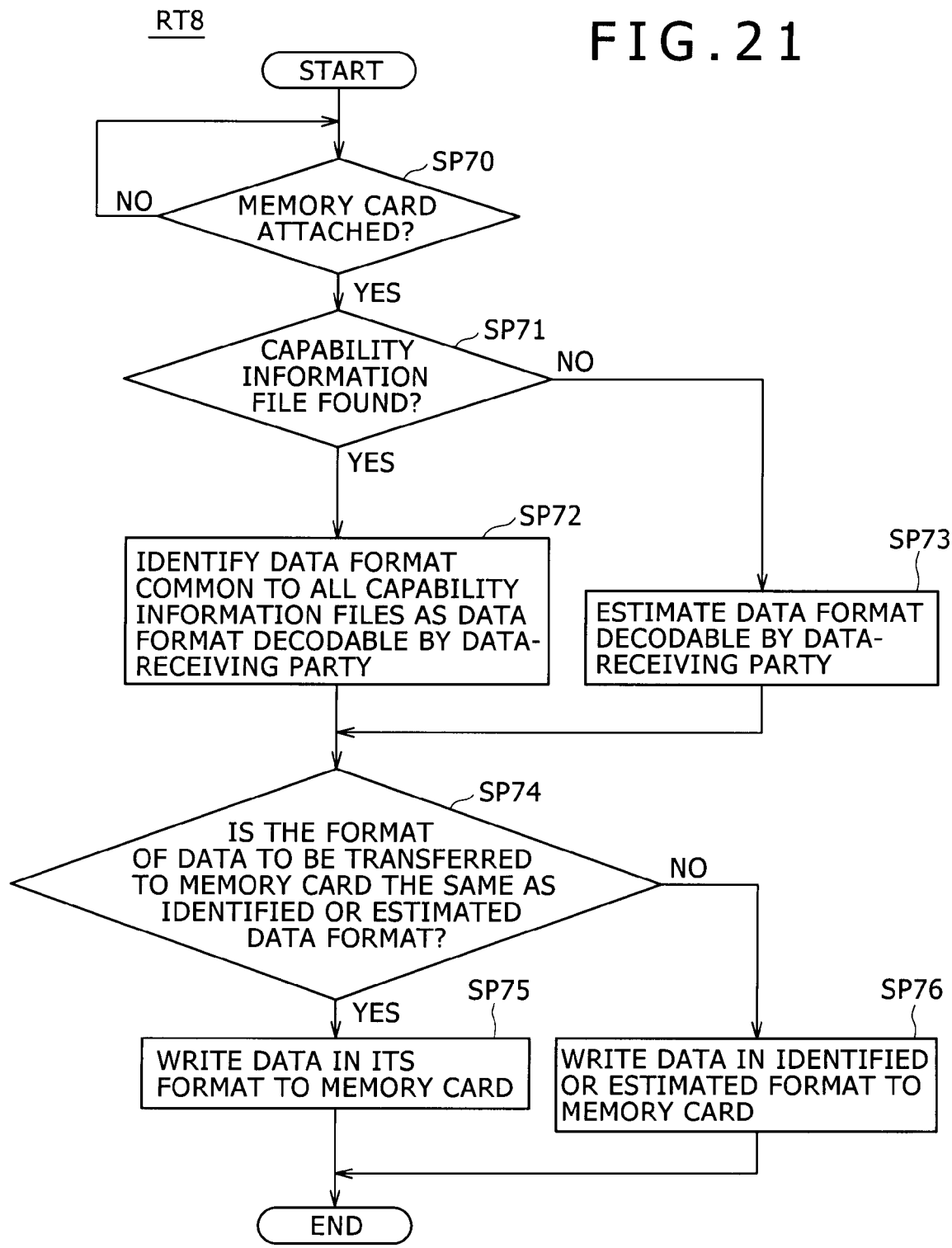
FIG. 21 is a flowchart of steps constituting a data writing procedure of the fifth embodiment.

Described below with reference to the flowchart of FIG. 21 is a procedure RT8 performed by the data storage device 3 for writing data to the memory card 2. The data writing procedure RT8 is a procedure carried out by the control unit 31 of the data storage device 3 in accordance with a program retrieved from an internal storage unit, not shown.

Upon activation, the control unit 31 of the data storage unit 3 starts up the data writing procedure RT8 and goes to step SP70. In step SP70, the control unit 31 waits for the memory card 2 to be attached. When the memory card 2 is found attached, the control unit 31 goes to step SP71.

In step SP71, the control unit 31 checks to determine whether at least one capability information file is written on the attached memory card 2. If the result of the check in step S71 is affirmative, then the control unit 31 goes to step SP72.

In step SP72, the control unit 31 controls the memory controller 33 to read all capability information files written on the memory card 2 in order to select a data format common to all the retrieved files, and identifies the selected data format as the data format (audio codec type) decodable by the terminal to which to deliver data by means of the memory card 2. Step SP72 is followed by step SP74.

If the result of the check in step SP71 is negative, then the control unit 31 goes to step SP73. In step SP73, the control unit 31 searches the attached memory card 2 for previously written data. The control unit 31 estimates that the data format of the data found by the search is decodable by the terminal to which to deliver data by way of the memory card 2, and goes to step SP74.

In step SP74, the control unit 31 checks that the data to be transferred to the memory card 2 has been selected by the user. When the selection of the data to be transferred is recognized, the control unit 31 checks to determine whether the data format of the transfer object data is the same as the data format identified in step SP72 or estimated in step SP73. If the result of the check in step SP74 is affirmative, that means the data format of the data to be transferred to the memory card 2 is decodable by the terminal to which to deliver the data by means of the memory card 2. In this case, the control unit 31 goes to step SP75. In step SP75, the control unit 31 writes the transfer object data in its data format to the memory card 2. The control unit 31 then terminates the data writing procedure RT8.

If the result of the check in step SP74 is negative, that means the data format of the data to be transferred to the memory card 2 is not decodable by the terminal to which to deliver the data by way of the memory card 2. In this case, the control unit 31 goes to step SP76. In step SP76, the control unit 31 causes the encoding unit 37 to encode the transfer object data in a data format decodable by the target terminal before writing the encoded data to the memory card 2. The control unit 31 then terminates the data writing procedure RT8.

By executing the data writing procedure RT8 as described, the control unit 31 of the data storage device 3 writes the target data to the attached memory card 2.

In the data delivery system 1 of the fifth embodiment configured as described above, the memory card 2 with a plurality of capability information files written thereon may be attached to the data storage device 3. In turn, the data storage device 3 writes data to the attached memory card in the data format common to all the multiple capability information files found written on the memory card 2.

Where the data delivery system 1 of the fifth embodiment described above is in use, the data storage device 3 is arranged to write data to the memory card 2 in the data format decodable by all terminals to which the memory card in question was attached in the past. This makes it possible to deliver data by means of the memory card 2 to the data-receiving terminal in a data format more reliably decodable than before.

(6) Other Embodiments

According to the second embodiment discussed above, either an existing capability information file found on the attached memory card 2 is overwritten with a new file or a new information capability file is additionally written to the memory card 2 depending on the number of capability information files found previously written on the memory card 2. Alternatively, an existing capability information file may be overwritten with a new file or a new capability information file may be additionally written to the attached memory card 2 depending on the available capacity of the memory card 2.

For example, when the memory card 2 is attached to the audio player 4, the audio player 4 controls the memory controller 13 to verify the available capacity of the memory card 2. If the available capacity is larger than a predetermined threshold level, a new capability information file is additionally written to the memory card 2. If the available capacity is less than the predetermined level, then the oldest of the capability information files already written on the memory card 2 is overwritten with a new capability information file. This makes it possible to write the capability information file reliably to the memory card 2.

According to the third embodiment described above, the data storage device 3 displays the terminal identification information from each of the capability information files written on the memory card 2 so that the user may select desired terminal identification information, thereby indirectly selecting the corresponding capability information file. Alternatively, the timestamps of the capability information files may be displayed to let the user select a desired timestamp (i.e., date and time) thereby indirectly selecting the corresponding capability information file.

Suppose that a plurality of capability information files are written on the memory card 2 and that these files contain different timestamps because they were recorded at different dates and times. In this case, the timestamps of these files are displayed so that the user may select a desired timestamp thereby selecting the corresponding capability information file indirectly.

Figure 22:
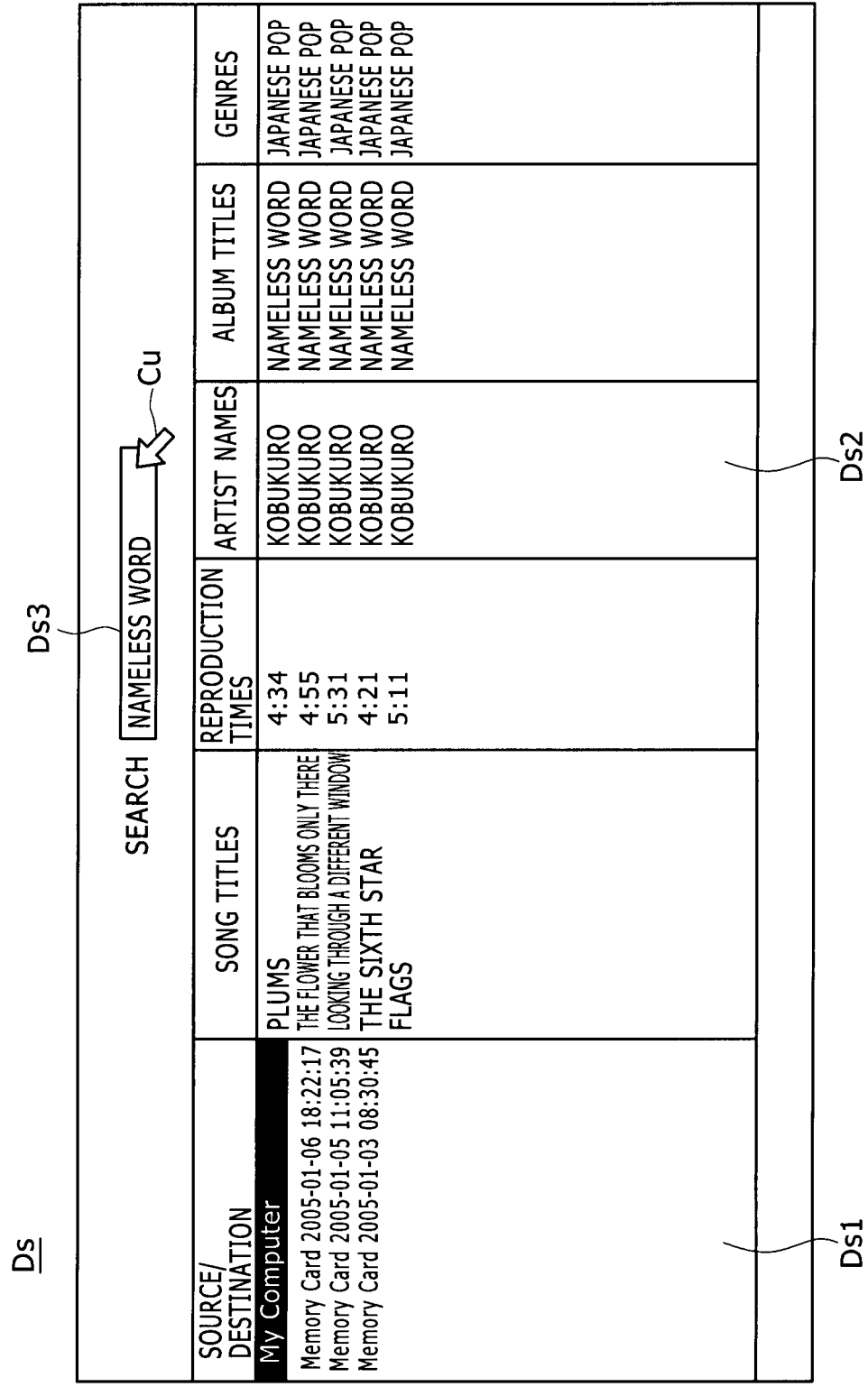
FIG. 22 is a schematic view showing a structure (part 1) of an audio data transfer screen according to another embodiment.

For example, as shown in FIG. 22, the source/destination list display area Ds1 of the audio data transfer screen Ds is arranged to display in list form the timestamps of, say, three capability information files written on the memory card 2 acting as the destination to which to transfer audio data, along with the name "My Computer" designating the data storage device 3 serving as the source from which to transfer the audio data. On the display of this example, each timestamp is prefixed with the name "Memory Card" indicating the memory card 2 for the user's convenience.

More specifically, the source/destination list display area Ds1 may display in list form "My Computer" in addition to the timestamps of the capability information files written on the memory card 2, each timestamp shown supplemented with the name "Memory Card" of the memory card 2 (e.g., "Memory Card 2005-01-06 18:22:17," "Memory Card 2005-01-05 11:05:39," and "Memory Card 2005-01-03 08:30:45").

In the manner described above, a history of the capability information files written on the memory card 2 is presented to the user so that the user may select a desired capability information file. This feature further improves the ease of use when data is to be transferred between two devices by means of the memory card 2.

Figure 23:
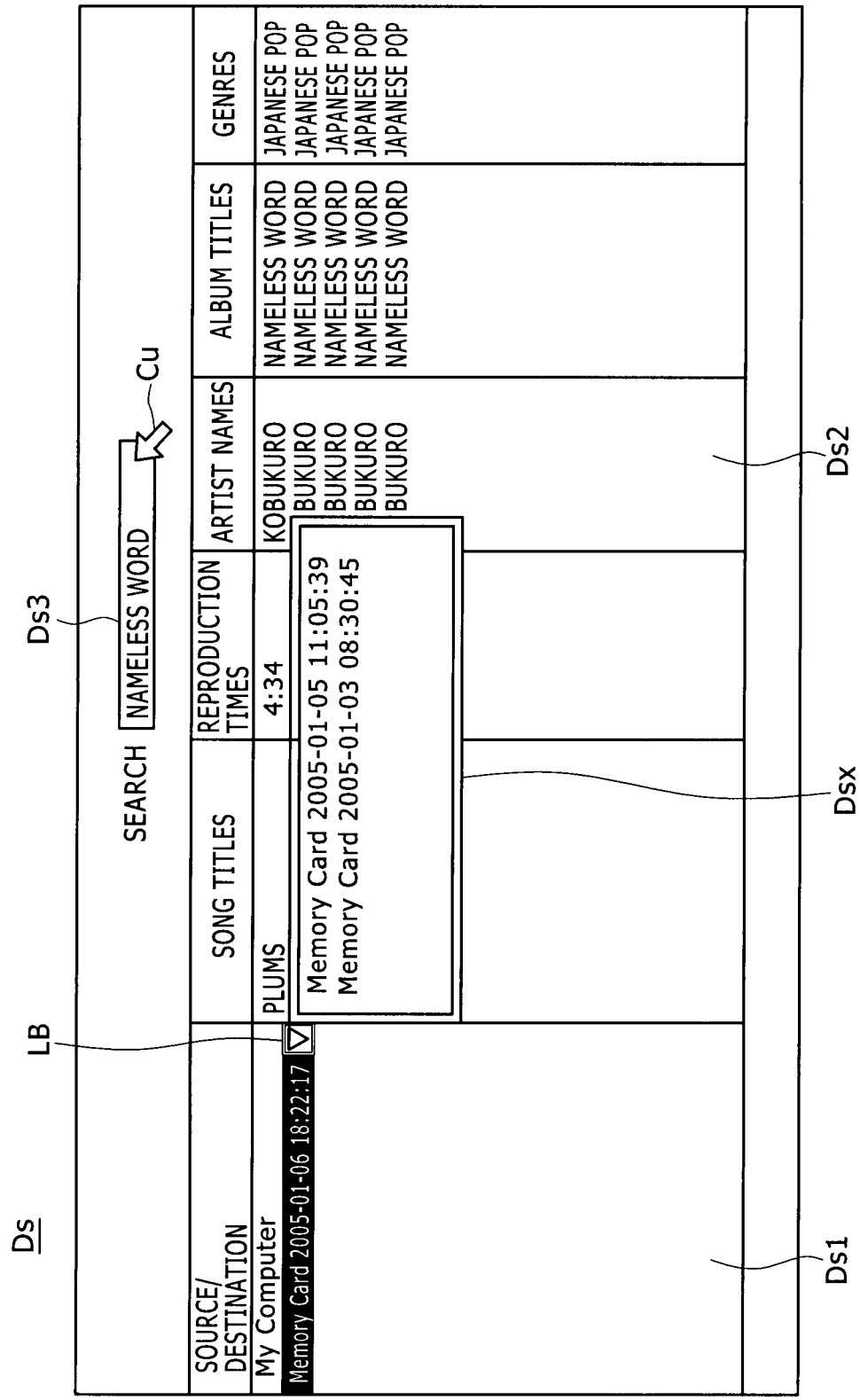
FIG. 23 is a schematic view showing the structure (part 2) of the audio data transfer screen according to another embodiment.

In another variation, as shown in FIG. 23, a main screen and a sub-screen may be provided. The main screen may be constituted by the source/destination list display area Ds1 and the sub-screen by a previous list display area Dsx additionally created. The source/destination list display area Ds1 as the main screen may be arranged to display "My Computer" as well as "Memory Card 2005-01-06 18:22:17," the latter information being the name of the memory card 2 prefixed to the timestamp of the most recent of the capability information files written on the memory card 2. This display contrasts distinctly with that of the sub-screen displaying the timestamps of the older capability information files each prefixed with the name of the memory card 2 (e.g., "Memory Card 2005-01-05 11:05:39" and "Memory Card 2005-01-03 08:30:45"). The previous list display area Dsx making up the sub-screen may be displayed only when a previous list display button LB is selected within the source/destination list display area Ds1.

Figure 24:
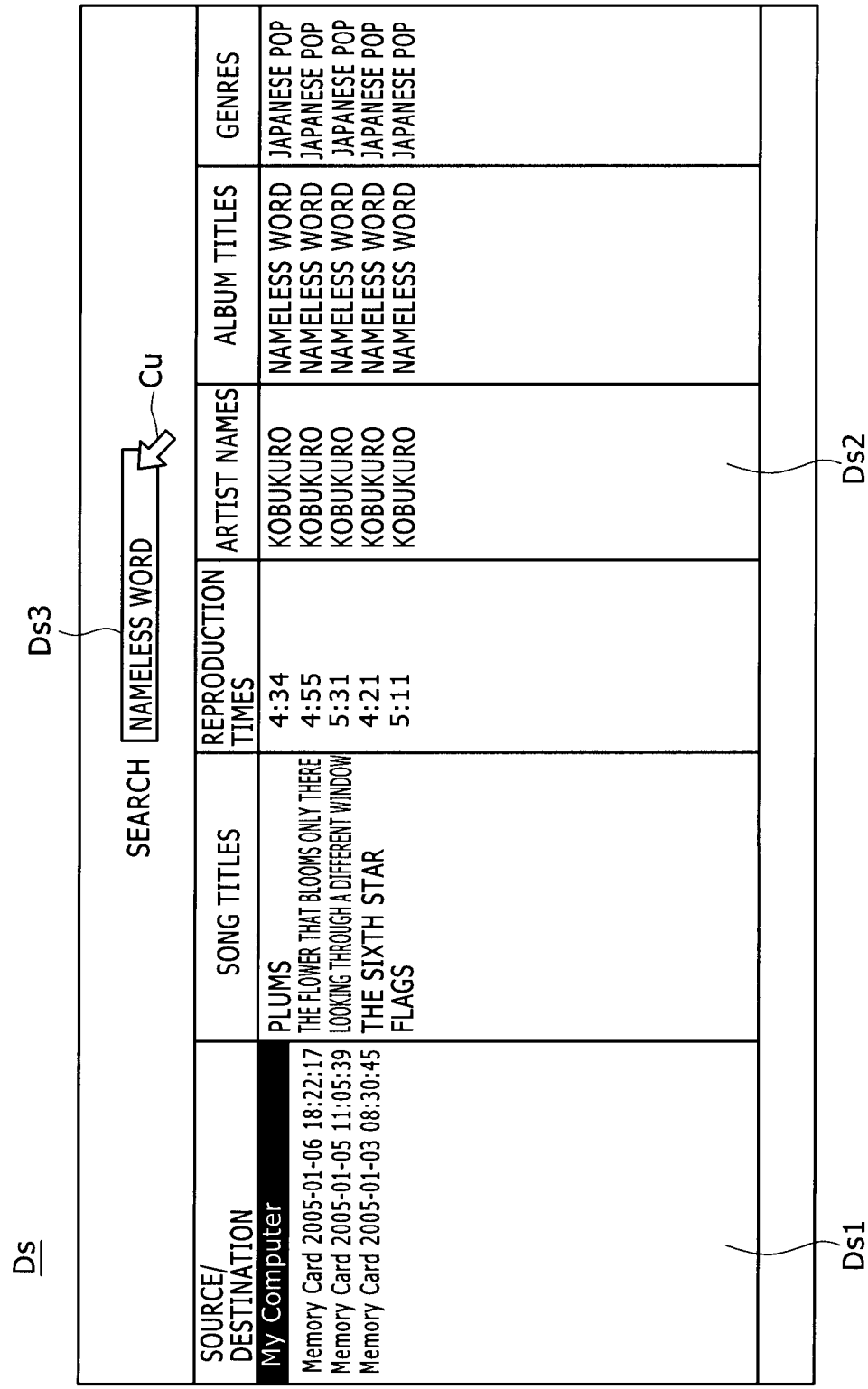
FIG. 24 is a schematic view showing the structure (part 3) of the audio data transfer screen according to another embodiment.

In another alternative, as shown in FIG. 24, the timestamps of the existing capability information files may be displayed in such a manner that each of the timestamps is prefixed with the nickname given to the corresponding capability information file. As long as capability information files are distinguished from one another by file-specific information (i.e., identification information of each capability information file), either the combinations of timestamps with terminal identification information of the capability information files involved may be displayed for the user to choose from, or the data formats of the files may be directly displayed for selection by the user.

According to the fifth embodiment discussed above, when a plurality of capability information files are found written on the memory card 2, data is written to the memory card 2 in the data format common to all these files. Alternatively, if there is no data format common to all capability information files written on the memory card 2, then data may be written to the memory card 2 in the data format shared by the majority of the files involved.

In another variation, data may be written to the memory card 2 in all data formats designated by a plurality of capability information files found written on the memory card 2. In that case, the audio data of, say, the same song or songs is recorded to the memory card 2 in all data formats represented by the multiple capability information files so that the terminal receiving the audio data in question via the memory card 2 can decode the data unfailingly.

According to the first through the fourth embodiments described above, if a plurality of data formats are designated by a single capability information file (i.e., if there exist multiple data formats decodable by one data-receiving terminal), the data storage device 3 transfers data in one of the multiple data formats. Alternatively, data may be transferred in the data format with the lowest data compression ratio, in the data format with the highest data compression ratio, or in one data format selected by the user from among the plurality of formats.

The above alternatives make it possible to transfer data in the data format with the lowest compression rate for users who favor high sound quality and image quality, or to transfer data in the data format with the highest compression rate for users who prefer having the largest possible number of data items stored on the memory card.

According to the first through the fifth embodiments described above, capability information files are stored on the memory card 2 alone. Alternatively, the capability information files may be saved on the data storage device 3.

Figure 25:
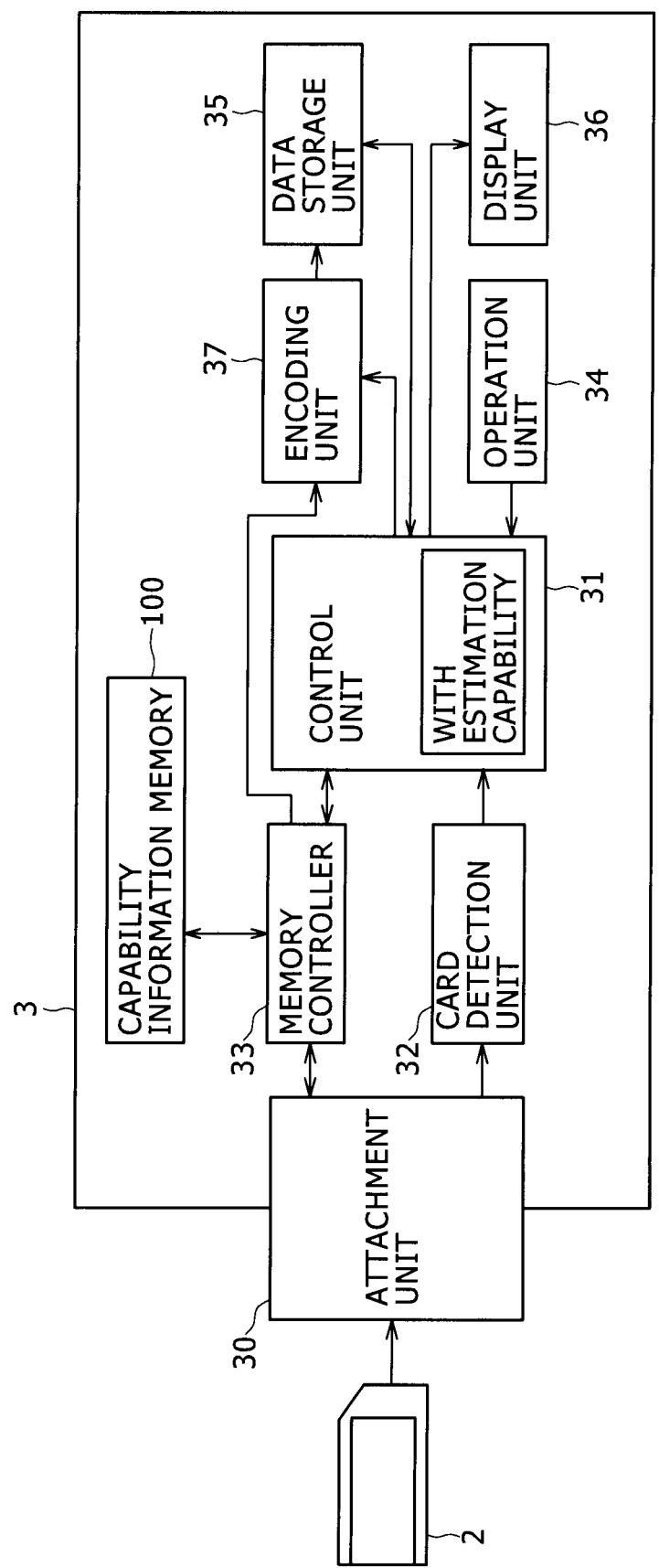
FIG. 25, is a block diagram showing functional blocks of a data storage device in another embodiment.

In such a case, as shown in FIG. 25 (in which like reference numerals designate like or corresponding parts found in FIG. 6), the data storage device 3 may be furnished with a capability information memory 100 that stores capability information files. When the memory card 2 is attached to the data storage device 3, the data storage device 3 may retrieve the capability information file from the attached card 2 and write the retrieved file to the capability information memory 100.

In the manner explained above, the data storage device 3 may store on the capability information memory 100 a plurality of capability information files acquired from a number of memory cards 2. The user may then be prompted to select a desired capability information file from the capability information files stored on the capability information memory 100. The user is thus given a greater freedom to select capability information files than before. If a memory card 2 with no capability information file written thereon is attached to the data storage device 3, the data storage device 3 can still allow the user to select a desired capability information file from the multiple capability information files stored on the capability information memory 100.

As an alternative to the foregoing example, if there is no capability information file found written on the memory card 2, the data storage device 3 may create a capability information file designating an estimated data format and may write this file to the capability information memory 100 for storage.

According to the first through the fifth embodiments discussed above, if the data format of the data to be transferred to the memory card 2 is not found in any of the capability information files written thereon, the data storage device 3 causes the encoding unit 37 to encode the transfer object data in the data format designated by one of the capability information files, before writing the newly encoded data to the memory card 2. Alternatively, the newly encoded data may be written not only to the memory card 2 but also to the data storage unit 35 of the data storage device 3.

With the above alternative in effect, when the data is to be again written to the memory card 2 in the same data format, the data storage device 3 need not encode the data again. The data in question need only be retrieved from the data storage device 3 for transfer to the memory card 2. This arrangement reduces processing load and shortens processing time when data is written.

According to the first through the fifth embodiments described above, the data storage device 3 transfers to the memory card 2 the data stored on the data storage device 35 itself. Alternatively, the data storage device 3 may acquire data from the outside through a suitable interface, not shown, before transferring the acquired data to the memory card 2.

According to the first through the fifth embodiments explained above, audio data and video data are transferred from one device to another by means of the memory card 2. Alternatively, the audio data or video data may be transferred along with a play list. In this case, the data storage device 3 may write to the memory card 2 the play list in a play list data format designated by a capability information file found on the memory card 2.

As another alternative, the data to be delivered by means of the memory card 2 may include not only audio data, video data and play lists, but also program data and other diverse data. For example, if the present invention is applied to a system whereby program data is delivered using the memory card 2, then a capability information file designating a program data format may first be written to the memory card 2, the designated data format being such as to be decodable (i.e., executable) by a terminal of the system that is to receive the program data via the memory card 2. When the memory card 2 is attached to a device of the system that delivers data, the device may write to the memory card 2 the program data of interest in the data format designated by the capability information file found written on the memory card 2.

According to the first through the fifth embodiments explained above, the present invention is applied to the data delivery system 1 whereby data is delivered using solely the memory card 2. Alternatively, the present invention may be applied to systems whereby data is delivered using various other information storage media including floppy (registered trademark) disks, CD-R (Compact Disk Recordable), and DVD-R (Digital Versatile Disk Recordable).

According to the first through the fifth embodiments discussed above, the timestamp denoted in the timestamp part X3 of each capability information file is handled as the date and time at which the capability information file in question was recorded. Alternatively, a timestamp appended to a capability information file by a file system of the terminal when that capability information file is recorded may be treated as the timestamp of that file.

According to the first through the fifth embodiments explained above, capability information files are created in XML. Alternatively, any suitable file format other than XML may be used to create capability information files. Any file format is acceptable as long as it can be recognized by both the terminal and the data storage device 3.

According to the first through the fifth embodiments discussed above, the above-described procedures RT1, RT3, and RT5 are carried out by the control unit 11 of the audio player 4 (i.e., players 4*a* through 4*d*) and by the control unit 21 of the video player 5 in accordance with programs preinstalled in an internal storage unit, not shown. Alternatively, the programs for executing these procedures RT1, RT3 and RT5 may illustratively be written beforehand on the memory card 2 so that the programs are installed from the memory card 2 into an internal storage units upon use.

According to the first through the fifth embodiments described above, the procedures RT2, RT4, RT6, RT7 and RT8 explained above are carried out by the control unit 31 of the data storage device 3 in accordance with programs preinstalled in an internal storage unit, not shown. Alternatively, the programs for executing these procedures RT2, RT4, RT6, RT7 and RT8 may illustratively be written beforehand on the memory card 2 so that the programs are installed from the memory card 2 into an internal storage unit upon use.

According to the first through the fifth embodiments discussed above, the audio player 4 (4*a* through 4*d*) acting as a terminal, a data reading unit, or a computer for reading data from the information storage medium is principally made up of the attachment unit 10, memory controller 13, audio decoding unit 16, control unit 11, and card detection unit 12. Alternatively, the audio player 4 (4*a* through 4*d*) may be structured using other diverse parts or components as long as they provide the same or equivalent capabilities.

According to the first through the fifth embodiments described above, the video player 5 acting as a terminal, a data reading unit, or a computer for reading data from the information storage medium is primarily constituted by the attachment unit 20, memory controller 23, video decoding unit 26, control unit 21, and card detection unit 22. Alternatively, the video player 5 may be structured using other diverse parts or components as long as they provide the same or equivalent capabilities.

Also according to the first through the fifth embodiments explained above, the data storage device 3 serving as an information processing apparatus, a data writing unit, or a computer for writing data to the information storage medium is mainly composed of the attachment unit 30, memory controller 33, control unit 31, encoding unit 37, data storage unit 35, and capability information memory 100. Alternatively, the data storage device 3 may be structured using other diverse parts or components as long as they provide the same or equivalent capabilities.

As described, the present invention may be implemented illustratively as an audio system, a video system, a computer system, or any other suitable system whereby data is delivered from one device to another using information storage media.

It should be understood by those skilled in the art that various modifications, combinations, sub-combinations and alterations may occur depending on design requirements and other factor in so far as they are within the scope of the appended claims or the equivalents thereof.

What is claimed is:

1. A terminal apparatus for writing and reading data to and from a detachable information storage medium, said terminal apparatus comprising:
   an attachment unit configured to have said detachable information storage medium attached thereto;
   a writing unit configured to write data to said detachable information storage medium attached to said attachment unit;
   a reading unit configured to read data from said detachable information storage medium attached to said attachment unit;
   a decoding unit configured to decode the data read by said reading unit;
   a storage unit configured to store a capability information file including
      a definition part to define keywords of the capability information file,
      an identification part to define an identity of the terminal apparatus,
      a timestamp part to define a value corresponding to a date and time at which the detachable information storage medium was attached to the first attachment unit, and
      a data format part to define a data format that is decodable by the terminal apparatus; and
   a control unit configured to control said writing unit to write said capability information file stored in said storage unit to said detachable information storage medium, the terminal apparatus exchanging information with an information processing apparatus via attachment and detachment of the detachable information storage medium to the attachment unit.

2. The terminal apparatus according to claim 1, further comprising:
   a detection unit configured to detect whether said detachable information storage medium is attached to said attachment unit, wherein
   said control unit is further configured to control said writing unit to write said capability information file stored in said storage unit to said detachable information storage medium when said detection unit detects said detachable information storage medium is attached to said attachment unit.

3. The terminal apparatus according to claim 1, wherein said identification part of the capability information file indicates any one of a model name, a nickname, and an encoding format, said model name and said nickname each identifying said terminal apparatus, said encoding format being decodable by said decoding unit.

4. The terminal apparatus according to claim 1, wherein said control unit is further configured to control said writing unit to overwrite a capability information file written previously on said detachable information storage medium with said capability information file stored in said storage unit.

5. The terminal apparatus according to claim 1, wherein said control unit is further configured to control said writing unit to write said capability information file stored in said storage unit to said detachable information storage medium separately from a capability information file written previously on said detachable information storage medium.

6. The terminal apparatus according to claim 5, wherein, when a number of capability information files written previously on said detachable information storage medium reaches a predetermined value, said control unit is further configured to control said writing unit to overwrite an oldest capability information file of the previously written capability information files with said capability information file stored in said storage unit.

7. The terminal apparatus according to claim 5, wherein, depending on an available capacity of said detachable information storage medium, said control unit is further configured to control said writing unit to overwrite an oldest capability information file of the previously written capability information files with said capability information file stored in said storage unit.

8. The terminal apparatus according to claim 5, wherein, when a capability information file is previously written on said detachable information storage medium, said control unit is further configured to control said writing unit to update a timestamp of the previously written capability information file.

9. An information processing apparatus for writing and reading data to and from a detachable information processing medium, said information processing apparatus comprising:
   an attachment unit configured to have said detachable information storage medium attached thereto;
   a writing unit configured to write data to said detachable information storage medium attached to said attachment unit;
   a reading unit configured to a read capability information file from said detachable information storage medium attached to said attachment unit, said capability information including
   a definition part to define keywords of the capability information file,
   an identification part to define an identity of a corresponding terminal apparatus,
   a timestamp part to define a value corresponding to a date and time at which the detachable information storage medium was attached to the corresponding terminal apparatus, and
   a data format part to define a data format that is decodable by the corresponding terminal apparatus; and
   a control unit configured to control said writing unit, upon detection of a request to write data to said detachable information storage medium, to write the data to said detachable information storage medium in said data format indicated by said capability information file,
   wherein the information processing apparatus exchanges information with the corresponding terminal apparatus via attachment and detachment of the detachable information storage medium to the attachment unit.

10. The information processing apparatus according to claim 9, wherein, when a plurality of capability information files are written on said detachable information storage medium, then said control unit is further configured to identify a single one of the capability information files based on the timestamp parts of the plurality of files of capability information files, and control said writing unit to write said data to said detachable information storage medium in a data format indicated by a data format part of the identified capability information file.

11. The information processing apparatus according to claim 9, wherein, when a plurality of files of capability information files are found written on said detachable information storage medium, then said control unit is further configured to control a display unit to output a plurality of items of identification information identifying said plurality of capability information files to notify a user of said items of identification information, and control said writing unit to write to said detachable information storage medium in a data format indicated by a data format part of a capability information file identified by a user-selected item of identification information of said plurality of items of identification information.

12. The information processing apparatus according to claim 11, wherein said control unit is further configured to control said display unit to output a user interface including a main screen and a sub-screen, said main screen displaying an item of identification information identifying a latest of said plurality of capability information files written on said detachable information storage medium, said sub-screen displaying said plurality of items of identification information identifying said plurality of capability information files.

13. The information processing apparatus according to claim 9, wherein, when a plurality of capability information files are written on said detachable information storage medium, then said control unit is further configured to delete all capability information files other than a latest of said plurality of capability information files from said detachable information storage medium.

14. The information processing apparatus according to claim 9, wherein, when a plurality of capability information files are written on said detachable information storage medium, then said control unit is further configured to control said writing unit to write to said detachable information storage medium in a plurality of data formats indicated by said plurality of files of capability information files.

15. The information processing apparatus according to claim 9, wherein, when a plurality of capability information files are written on said detachable information storage medium, then said control unit is further configured to control said writing unit to write to said detachable information storage medium in a data format commonly indicated by said plurality of capability information files.

16. The information processing apparatus according to claim 9, further comprising:
an encoding unit configured to convert data into a data format; and
a data storage unit, wherein,
upon detection of a request to write data to said detachable information storage medium, said control unit is further configured to control said encoding unit to convert said data into said data format indicated by said capability information file read by said reading unit, said control unit being further configured to control said writing unit to write the converted data to said detachable information storage medium and said data storage unit.

17. The information processing apparatus according to claim 9, further comprising:
a capability information storage unit configured to store capability information files, wherein
said control unit is further configured to control said reading unit to read the capability information file written on said detachable information storage medium while controlling said writing unit to write the capability information file read by said reading unit to said capability information storage unit, and to control said writing unit, upon detection of a request to write data to said detachable information storage medium, to write said data to said detachable information storage medium in a data format indicated by said capability information file written by said writing unit to said capability information storage unit.

18. The information processing apparatus according to claim 17, wherein said control unit is further configured to control said reading unit to read data written to said detachable information storage medium, produce estimated capability information from the data read by said reading unit, and control said writing unit to write a capability information file including the estimated capability information to said capability information storage unit.

19. A data delivery system comprising an information processing apparatus configured to write data to a detachable information storage medium and a terminal apparatus configured to read from said detachable information storage medium the data written by said information processing apparatus,
said terminal apparatus including
a first attachment unit configured to have said detachable information storage medium attached thereto,
a first writing unit configured to write data to said detachable information storage medium attached to said first attachment unit,
a first reading unit configured to read data from said detachable information storage medium attached to said first attachment unit,
a decoding unit configured to decode the data read by said first reading unit;
a storage unit configured to store a capability information file including
a definition part to define keywords of the capability information file,
an identification part to define an identity of the terminal apparatus,
a timestamp part to define a value corresponding to a date and time at which
the detachable information storage medium was attached to the first attachment unit, and
a data format part to define a data format that is decodable by the terminal apparatus, and
a first control unit configured to control said first writing unit to write said capability information stored in said storage unit to said detachable information storage medium, and
said information processing apparatus including
a second attachment unit configured to have said detachable information storage medium attached thereto,
a second writing unit configured to write data to said information storage medium attached to said second attachment unit, a second reading unit configured to read said capability information from said detachable information storage medium attached to said second attachment unit, and a second control unit configured to control said second writing unit, upon detection of a request to write data to said detachable information storage medium, to write the data to said detachable information storage medium in a data format indicated by said data format part of the capability information file as decodable by the terminal apparatus, wherein the terminal apparatus and the information processing apparatus exchange information via attachment and detachment of the detachable storage medium to the first and second attachment units respectively.

20. A capability notification method for enabling a terminal apparatus to notify an information processing apparatus of capabilities of said terminal apparatus, said terminal apparatus reading data from detachable information storage medium, said information processing apparatus writing data to said detachable information processing medium, said capability notification method comprising:

detecting whether said detachable information storage medium is attached to said terminal apparatus; and upon detection of said detachable information storage medium being attached, writing a capability information file to said detachable information storage medium, said capability information including a definition part to define keywords of the capability information file, an identification part to define an identity of the terminal apparatus, a timestamp part to define a value corresponding to a date and time at which the detachable information storage medium was attached to the terminal apparatus, and a data format part to define a data format that is decodable by the terminal apparatus, and, wherein the detachable information storage medium transfers information between the information processing apparatus and the terminal apparatus by attachment and detachment thereto.

21. A data writing method for writing data to a detachable information storage medium, said data writing method comprising:

reading from said detachable information storage medium a capability information file including a definition part to define keywords of the capability information file, an identification part to define an identity of a corresponding terminal apparatus, a timestamp part to define a value corresponding to a date and time at which the detachable information storage medium was attached to the corresponding terminal apparatus, and a data format part to define a data format that is decodable by the corresponding terminal apparatus; and upon detection of a request to write data to said detachable information storage medium, writing the data to said detachable information storage medium in a data format indicated by the data format part of said capability information file, wherein the detachable information storage medium transfers information between the corresponding terminal apparatus and another device by attachment and detachment thereto.

22. A non-transitory computer readable storage medium storing computer readable instructions thereon that, when executed by an arithmetic processor, direct the arithmetic processor to execute a capability notification procedure comprising:

detecting whether a detachable information storage medium is attached to a terminal apparatus; and upon detection of said detachable information storage medium being attached, writing a capability information file to said detachable information storage medium, said capability information including a definition part to define keywords of the capability information file, an identification part to define an identity of the terminal apparatus, a timestamp part to define a value corresponding to a date and time at which the detachable information storage medium was attached to the terminal apparatus, and a data format part to define a data format that is decodable by the terminal apparatus, and, wherein the detachable information storage medium transfers information between the information processing apparatus and the terminal apparatus by attachment and detachment thereto.

23. A non-transitory computer readable storage medium storing computer readable instructions thereon that, when executed by an arithmetic processor, direct the arithmetic processor to execute a data writing procedure comprising:

reading from said detachable information storage medium a capability information file including a definition part to define keywords of the capability information file, an identification part to define an identity of a corresponding terminal apparatus, a timestamp part to define a value corresponding to a date and time at which the detachable information storage medium was attached to the corresponding terminal apparatus, and a data format part to define a data format that is decodable by the corresponding terminal apparatus; and upon detection of a request to write data to said detachable information storage medium, writing the data to said detachable information storage medium in a data format indicated by the data format part of said capability information file, wherein the detachable information storage medium transfers information between the corresponding terminal apparatus and another device by attachment and detachment thereto.

* * * * *